(12) United States Patent
Barsumian

(10) Patent No.: US 6,604,478 B2
(45) Date of Patent: Aug. 12, 2003

(54) HULL CONFIGURATION UTILIZING MULTIPLE EFFECTS FOR ENHANCED SPEED, RANGE AND EFFICIENCY

(76) Inventor: Bruce R. Barsumian, 459 Hampton Cir., Cookeville, TN (US) 38501

( * ) Notice: Subject to any disclaimer, the term of this patent is extended or adjusted under 35 U.S.C. 154(b) by 0 days.

(21) Appl. No.: 09/907,985

(22) Filed: Jul. 18, 2001

(65) Prior Publication Data

US 2002/0011199 A1 Jan. 31, 2002

Related U.S. Application Data

(63) Continuation-in-part of application No. 09/441,430, filed on Nov. 16, 1999, now Pat. No. 6,293,216.

(51) Int. Cl.$^7$ ................................. B63B 1/34
(52) U.S. Cl. .................. 114/67 A; 114/289; 114/291; 114/61.1
(58) Field of Search .................. 114/67 A, 67 R, 114/271, 272, 274, 61.1

(56) References Cited

U.S. PATENT DOCUMENTS

| | | | |
|---|---|---|---|
| 3,938,463 A | * | 2/1976 | Hecker et al. .............. 416/202 |
| 3,968,763 A | | 7/1976 | Mason |
| 4,090,459 A | | 5/1978 | Chaplin |
| 4,165,703 A | | 8/1979 | Burg |
| 4,169,514 A | | 10/1979 | Wheeler et al. |
| 4,196,686 A | | 4/1980 | Moran |
| 4,506,618 A | | 3/1985 | Chaplin |
| 4,543,901 A | | 10/1985 | Stringer |
| 4,587,918 A | * | 5/1986 | Burg .......................... 114/67 A |
| 4,708,077 A | | 11/1987 | Balquet et al. |
| 4,714,041 A | | 12/1987 | Jaffre et al. |
| 4,836,121 A | | 6/1989 | Kordon |
| 4,890,564 A | * | 1/1990 | Burg .......................... 114/67 A |
| 5,000,107 A | * | 3/1991 | Burg .......................... 114/67 A |
| 5,176,095 A | | 1/1993 | Burg |
| 5,273,127 A | | 12/1993 | Burg |
| 5,415,120 A | | 5/1995 | Burg |
| 5,454,440 A | | 10/1995 | Peters |
| 5,524,568 A | * | 6/1996 | Bobst .......................... 114/222 |
| 5,570,650 A | | 11/1996 | Harley |
| 5,611,294 A | * | 3/1997 | Burg .......................... 114/272 |
| 5,746,146 A | | 5/1998 | Bixel |
| 5,860,380 A | | 1/1999 | Burg |
| 5,950,559 A | | 9/1999 | Klem |

FOREIGN PATENT DOCUMENTS

AU    WO 95/14604    6/1995

* cited by examiner

*Primary Examiner*—Stephen Avila
(74) *Attorney, Agent, or Firm*—Holland & Knight LLP

(57) ABSTRACT

A hull configuration for a vessel that utilizes multiple effects to reduce friction between the vessel and the water's surface is provided by the present invention. In various embodiments, a surface effect is employed such that a supporting cushion of air is provided underneath the hull to substantially isolate portions of the hull from coming into contact with the water's surface. A blower is used to provide pressurized air to the air cushions. The inlet of the blower is positioned in the direction of the vessel's movement such that a ram air effect decreases the power required by the blower. An amount of thrust is also generated by the forward placement of the blower inlet. The vessel has a superstructure that is shaped to create a low pressure zone above the vessel. This low pressure zone creates a lifting body effect such that the friction between the hull and the water's surface is reduced. Boost ports induce a venturi effect by providing a high pressure air flow at the water air boundary of the air cushion. Thus, the boost ports decrease the time required to re-establish an operating pressure in the air cushions after a venting has occurred. The above discussed aspects of the invention result in enhanced speed, range and efficiency for the vessel. Thus, the present invention has particular applicability to fast ferries, military patrol craft and landing crafts.

20 Claims, 21 Drawing Sheets

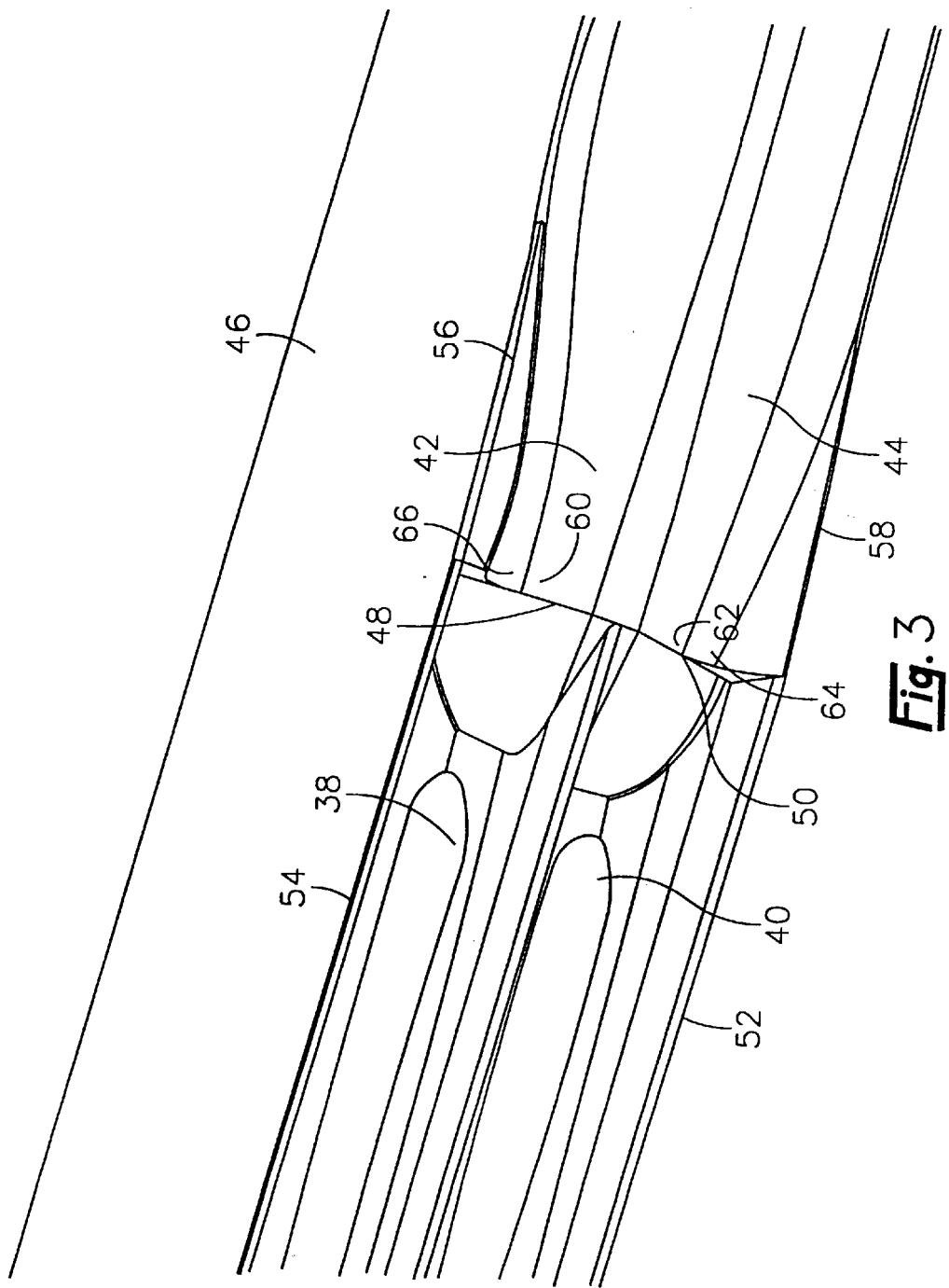

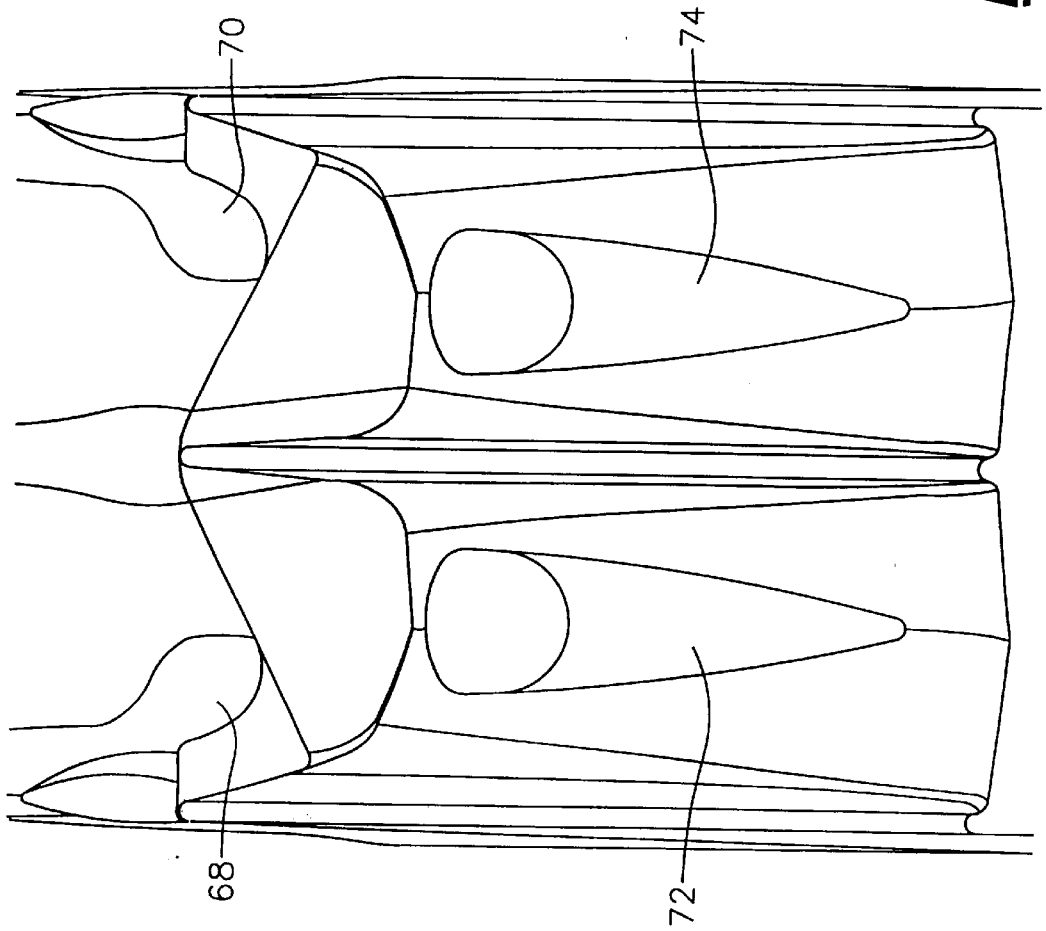

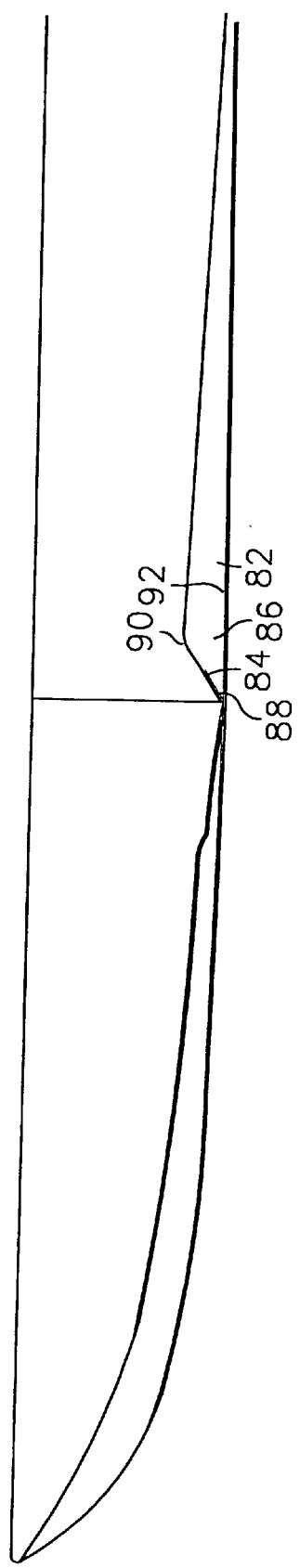

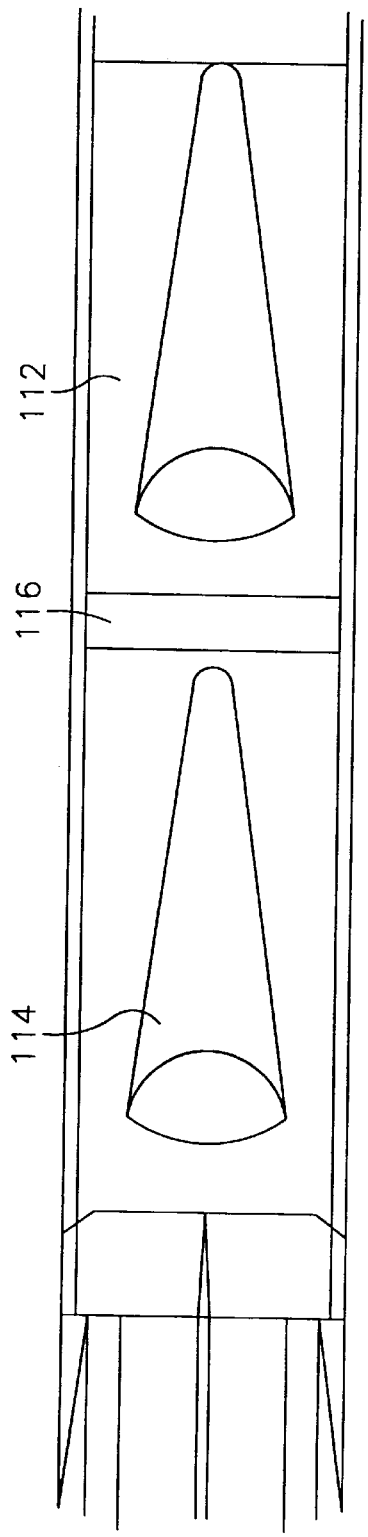
_Fig._ 8A
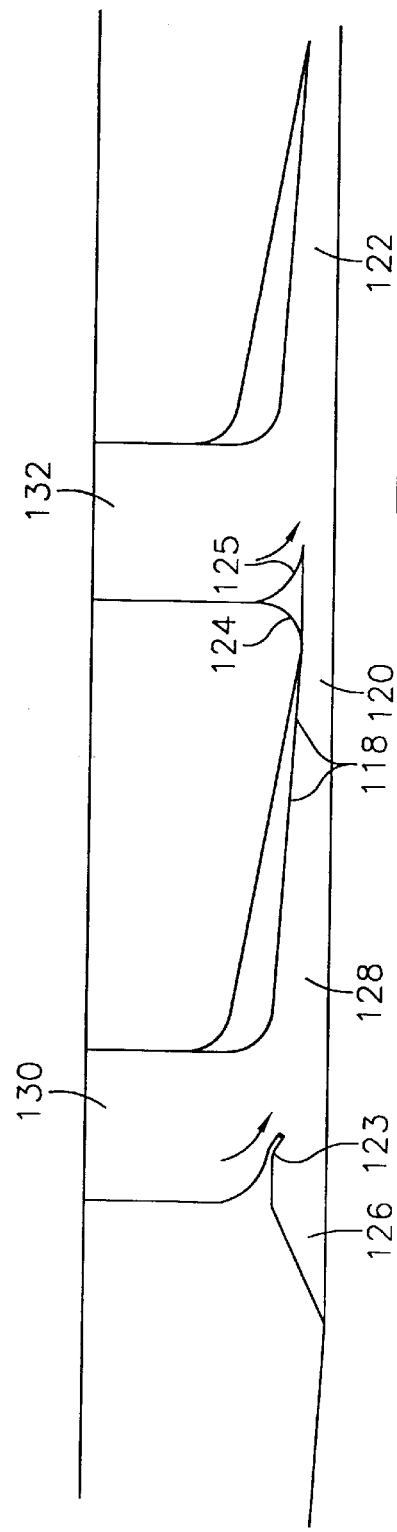
_Fig._ 8B

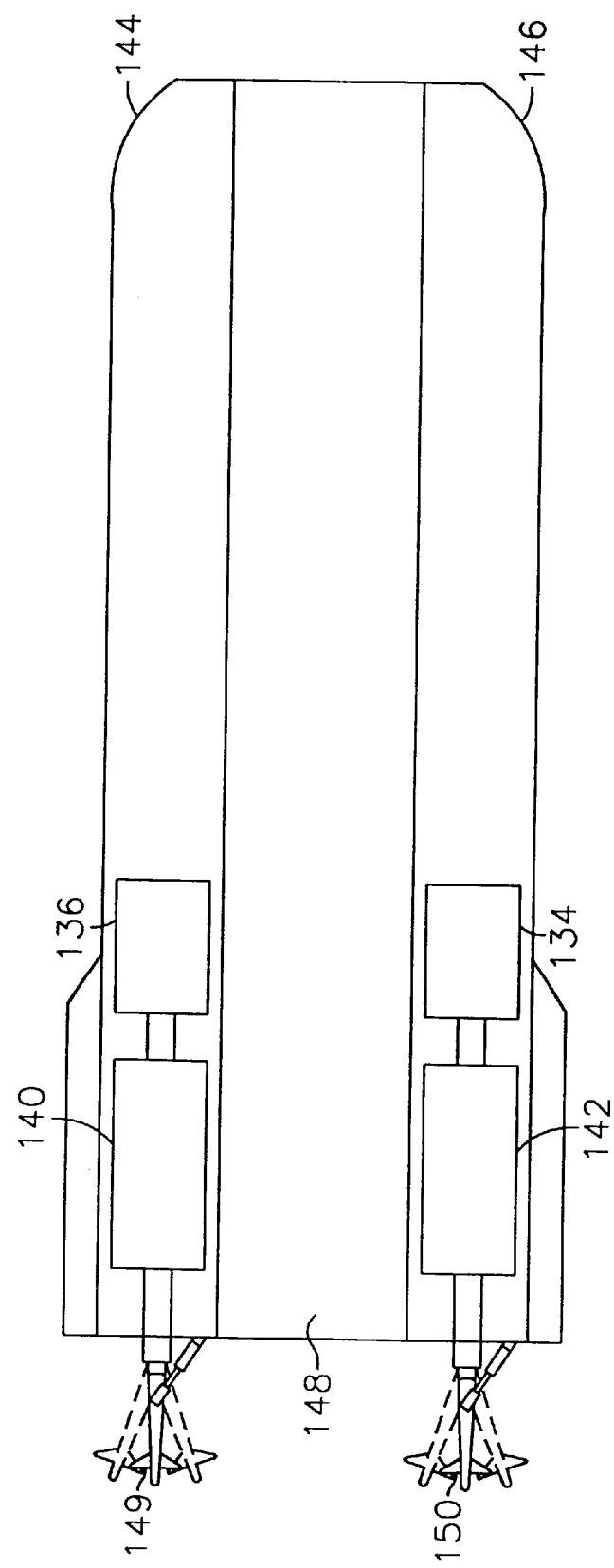

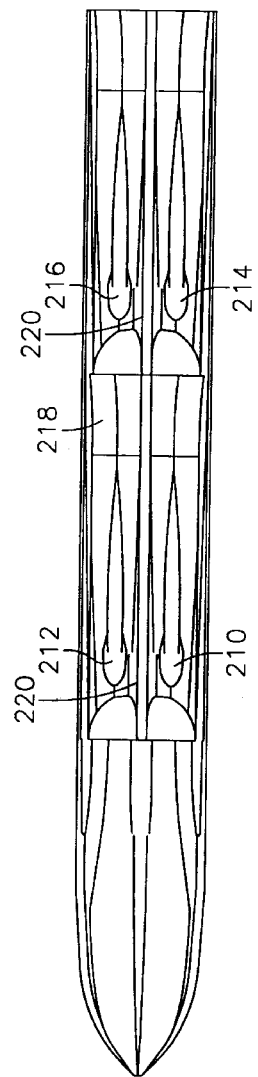

HULL CONFIGURATION UTILIZING MULTIPLE EFFECTS FOR ENHANCED SPEED, RANGE AND EFFICIENCY

This is a continuation-in-part of application Ser. No. 09/441,430 filed Nov. 16, 1999 and entitled "Surface Effect Boat Hull Having Improved High Speed Characteristics" now U.S. Pat. No. 6,293,216 issued Sep. 25, 2001.

FIELD OF THE INVENTION

The present invention relates generally to the field of surface effect vessels. More particularly, the invention relates to a hull configuration and engine/blower arrangement for a high speed surface effect vessel that utilizes cushions of air to reduce friction between the boat hull and water surface.

BACKGROUND OF THE INVENTION

Surface effect vessels which use cushions of air to reduce friction between the boat hull and the water are well known in the prior art. Basically, surface effect vessel technology involves injecting pressurized air under or between the hulls of a boat so that at least a portion of the boat's hull rides upon a cushion of air. By utilizing gas pressure contained within a pocket under the hull, a surface effect vessel can operate at higher speeds and reduced power levels as compared to conventional vessels. This increased performance is due to the fact that the friction between the air cushion and the boat hull is substantially less than the friction between the water and the boat hull. Thus, riding upon a cushion of air allows a surface effect vessel to reach higher speeds and operate more efficiently with a smaller engine than a typical vessel.

There are many prior art designs which utilize this surface effect. For examples, see U.S. Pat. Nos. 5,860,380, 5,611,294, 5,415,120 and 5,176,095 to Burg, U.S. Pat. No. 5,570,650 to Harley, U.S. Pat. No. 4,574,724 to Stolper and U.S. Pat. No. 3,968,763 to Mason, the disclosures of which are hereby incorporated by reference. One of the primary problems with these and all other prior art designs is that the water/air seal that is maintained by the displacement of the hull allows excessive amounts of air to escape. This air loss increases the volume and pressure of the air required to maintain an air cushion under the vessel. Producing and providing pressurized air requires power from the vessel's engines and blowers. Thus, the efficiency and performance of the vessel are greatly diminished when air escapes from the supporting air cushion.

Prior art surface effect vessels, such as those discussed above, further suffer from a number of other additional problems. For example, prior art surface effect vessels have a greater tendency to loose their supporting cushion of air in choppy or rough seas. As the surface effect vessel rolls in the rough seas, air in the supporting cushion tends to escape from the sides of the boat hull. In addition, air tends to escape from the supporting air cushion when the aft and bow portions of the surface effect vessel are lifted out of the water as the vessel pitches or rides over wave peaks. When air from the air cushion is lost, a larger portion of the vessel's hull comes into contact with the water's surface. This air loss results in dramatically increased friction between the vessel and the water and causes the vessel to slow down or lurch. Thus, maintaining the low friction air cushion beneath a vessel's hull under adverse conditions is an important aspect of the design of surface effect vessels.

One prior art approach to maintaining the air cushion utilizes a flexible skirt positioned around the edges of the boat hull to help contain the air cushion. An example of such an embodiment is a hovercraft. Hovercraft are designed to vent air from their supporting air cushion in all directions. Surface effect ships typically utilize front and back flexible skirts with rigid side hulls. Unfortunately, the flexible skirts used in these types of applications increase the resistance of the vessel through contact with the water's surface. Furthermore, the lifting air flows tend to escape from the skirts and be wasted when the hulls are lifted in high sea states. In addition, these flexible skirts require extensive and expensive maintenance. Furthermore, these skirts are still prone to allow more air to escape from the air cushion in rough seas.

Yet another problem with prior art surface effect vessels is that their hulls are substantially planar in the area in front of the air cavity. The hull is constructed to be planar in the region in front of the air cavity to allow the air cushion to extend as far as possible to the sides of the vessel. However, at high speeds or in rough seas, this planar hull section will tend to ride up on wave peaks. The bouncing of the vessel results in a rough bumpy ride and decreased stability. In addition, as the planar hull section rises and falls in the heavy seas, air tends to vent from the supporting air cushion. Therefore, what is needed is a surface effect vessel that is configured to operate in heavy seas.

V-shaped hulls are designed to provide an improved ride in rough water, as compared to relatively flat hulls, by deflecting wave energy away from and to the sides of the hull. Thus, traditional V-shaped hulls provide improved ride qualities at the expense of low speed planing and fuel efficiency. However, if the hull of a surface effect ship is made a moderate to deep V-shape, air from the air cushion tends to vent from the sides of the V-shaped hull when the vessel's speed increases and the edges of the V-shaped hull rise out of the water. Thus, prior art surface effect vessels have not utilized deep-V hulls.

SUMMARY OF THE INVENTION

A preferred embodiment of the present invention is designed to address the above discussed problems with the prior art by providing an improved vessel for traveling over a water's surface. The vessel includes a hull for supporting the vessel upon the water's surface. The hull has at least one air cavity that is adapted to receive pressurized air from a blower. The blower has an air inlet that is positioned to face toward a bow of the vessel such that a pressure differential is generated whereby the blower generates an amount of forward thrust when air is sucked into the air inlet. The hull further includes a first air introduction means for introducing the pressurized air from the blower into the air cavity. Sealing side hull portions that are adapted to reduce air loss from the air cavity extend substantially parallel to the vessel's direction of movement along the hull. Air lubricators provide a lubricating air flow along the sealing side hull portions and within the hull. A second air introduction means provides a sealing airflow of pressurized air to an edge of the at least one air cavity. The second air introduction means provides air at a higher velocity than the first air introduction means. In an especially preferred embodiment, the second air introduction means are boost ports that introduce air into the at least one air cavity near a bow side edge of the at least one air cavity such that an air flow is established wherein the air flows toward an aft portion of the vessel. The boost ports introduce air having a pressure at least 1.2 times as high as the first air introduction means. Movable sealing wedges prevent air from escaping from the air cavity. The sealing wedges are biased such that they substantially maintain contact with the water's surface. The hull is configured such that, when the hull moves through air, air moving over the superstructure of the hull creates a low pressure zone above the superstructure of the hull such that the hull generates lift as the hull moves through the air.

The above discussed preferred embodiment of the present invention offers a number of substantial improvements over the prior art. For example, the supporting air cavity dramatically reduces the friction between the hull and the water's surface. This friction is further reduced by the air lubricators that provide lubricating air flows to selected areas of the hull. The air cushion is efficiently maintained by the boost ports and the side hulls such that the pressurized air in the air cavities is substantially prevented from venting and causing the vessel to lurch. The lifting body effect created by the superstructure decreases the apparent weight of the vessel on the water's surface thereby dramatically reducing the friction between the water and the lower portions of the hull. The pressure differential created by the forward placement and orientation of the blower inlet provides additional thrust to the vessel. Thus, the utilization of the multiple performance enhancing effects discussed above provides the vessel with increased range, speed and efficiency. Thus, the present invention is particularly useful for commercial applications such as high speed ferries and military applications such as patrol craft.

Another embodiment of the present invention provides a multi-hulled vessel that includes at least two asymmetric hulls such that an air tunnel is formed between the two hulls. A tunnel compression flap adjustably controls the amount of air that can flow through the air tunnel. The vessel further includes an air cavity beneath each of the at least two hulls wherein the air cavities receive pressurized air from a blower. The blower is positioned to utilize a ram air effect. Boost ports provide a high velocity sealing air flow to the air cavities such that a portion of the pressurized air in the air cavities is prevented from escaping. A fairing inlet port also supplies a sealing air flow. A surface drive prop propels the vessel. Air lubricators provide a lubricating air flow to at least a portion of the asymmetric hulls that is in contact with the water. The air lubricators have slotted grooves for transferring a portion of the pressurized air from the air cavities to portions of the hulls that are in contact with water. The slots are configured to provide a substantially uniform air flow. The vessel has a superstructure that is aerodynamically shaped to provide lift to the multi-hulled vessel when the multi-hulled vessel is moving by creating a low pressure zone above the superstructure.

The tunnel compression effect, ram air effect and lifting body effect of the above described embodiment combine to provide a surface effect vessel that has enhanced performance when compared to prior art designs. In particular, the tunnel compression effect acts in conjunction with the lifting body effect to provide lift that minimizes the friction between the vessel and the water's surface. Furthermore, the ram air effect, provides addition thrust to the vessel without incurring any additional penalties in fuel consumption.

The present invention also encompasses a preferred method of constructing a surface effect vessel. In accordance with the preferred method, a lifting body configuration is utilized to provide aerodynamic lift when the vessel is in motion. The hull is further configured to utilize a tunnel compression effect. A surface effect means is utilized to provide pressurized air to at least one air cavity underneath the hull such that the pressurized air in the air cavity substantially prevents a portion of the hull from coming into contact with the water. The surface effect means is positioned on the vessel such that an air inlet of the surface effect means is oriented to utilize a ram air effect to generate an amount of forward thrust. A venturi effect is utilized to maintain air pressure in the air cavity. A control surface is provided to utilize air movement over the control surface to controllably produce either a lifting force or a downward force on the hull.

In yet another embodiment of the present invention, a boat is provided that has at least two asymmetric hull sections connected by an inner deck structure such that the inner deck structure is supported above the water's surface to form an air tunnel between the two asymmetric hull sections. Air tunnel restricting means adjustably restrict the amount of air that can flow through the air tunnel thereby by inducing a tunnel compression effect. The boat includes a blower for providing pressurized air underneath the two hull sections such that a portion of the two hull sections is substantially prevented from coming into contact with the water's surface. The blower has an inlet that is positioned such that air is forced into the inlet when the boat is moving in a forward direction. An air outlet damper and an air inlet damper controllably restrict the amount of air exiting and entering the blower. Water redirecting projections direct a flow of water toward a blow through area such that a portion of the pressurized gas is prevented from venting from underneath the asymmetric hulls through the blow through area. A venturi effect is utilized to draw air underneath the hulls. A surface drive prop provides thrust to propel the boat hull across the water's surface. The surface drive prop has blades having a pitch that is controllably adjustable. An engine powers the blower and the surface drive prop. Coupling means couple the prop and the blower to the engine. The coupling means allow the prop to operate at a speed that is substantially independent of the speed of the engine. Air lubricators provide a lubricating air flow along portions of the two asymmetric hull sections. A non-trip side projection positioned on an exterior of each of the asymmetric hull portions exerts an upward force upon the associated asymmetric hull portion when the boat tips toward the non-trip side projection. Flow separators are positioned on the side hull portions such that the flow separators direct water away from the side hull portions.

The previously discussed embodiment of the present invention utilizes a number of friction reducing effects and features to improve the performance of a boat. In addition, the boat has features that allow the blower and the surface drive prop to be powered by the same engine. This is important because it is often desirable to have the blower provide a relatively constant air pressure while the prop is typically controlled with a throttle. In particular, the inlet and outlet dampers allow the speed of the blower to vary with the speed of the engine without a substantial change in the air pressure provided by the blower. Furthermore, the non-trip side projections allow the vessel to corner more tightly and improve the safety of the vessel by diminishing the likelihood of a rollover. Thus, this embodiment provides a number of distinct advantages over the prior art. While a number of embodiments have been described above, the embodiments are exemplary, not limiting, and it should be readily understood that the invention is susceptible to a variety of modifications and configurations. Therefore, having summarized various aspects of the invention in simplified form, the invention will now be described in greater detail with reference to the following figures wherein similar reference numerals designate similar features throughout the figures.

BRIEF DESCRIPTION OF THE DRAWINGS

FIG. 3 is a close up three dimensional view showing a preferred embodiment of a pair of water redirecting portions positioned on the leading edge of a side hull;

FIG. 4 is a three dimensional bottom view illustrating another embodiment of the present invention having water redirecting portions;

FIG. 6 is a cut away side view of an embodiment having a sloped transition region;

FIGS. 8(a) and (b) illustrate a bottom and a cutaway side view of an embodiment having bow and aft air cavities;

FIG. 9 shows a top view of a preferred blower and engine arrangement in accordance with the present invention;

FIG. 15 is a bottom view of an embodiment having longitudinally divided bow and aft air compartments;

FIGS. 21(a) and (b) respectively depict a side-view and an overhead view of an embodiment of the present invention utilizing spray rails.

DETAILED DESCRIPTION OF THE INVENTION

As briefly discussed above, preferred embodiments of the present invention are directed toward surface effect boat hulls having an air cavity that is in communication with a blower. The blower introduces pressurized air into the air cavity such that a portion of the boat's weight is supported by the air cushion. The air filled cavity preferably has a front portion which slopes upwardly from the water's surface in a forward section and slopes downwardly toward the water's surface in an aft portion. Side hulls, which are substantially perpendicular to the water's surface and run along the sides of the air cavity, help minimize the amount of air escaping from the sides of the cavity. In addition, the side hulls provide added stability through an outrigger like effect. This outrigger effect is particularly beneficial in helping stabilize a mono hulled vessel when the side hulls are designed to have a wider, flattened bottom with sloped edges. By utilizing gas pressure contained within a pocket or cavity, the surface effect vessel can operate at a higher speed or reduced power level as compared to conventionally hulled vessels.

Figure 1:
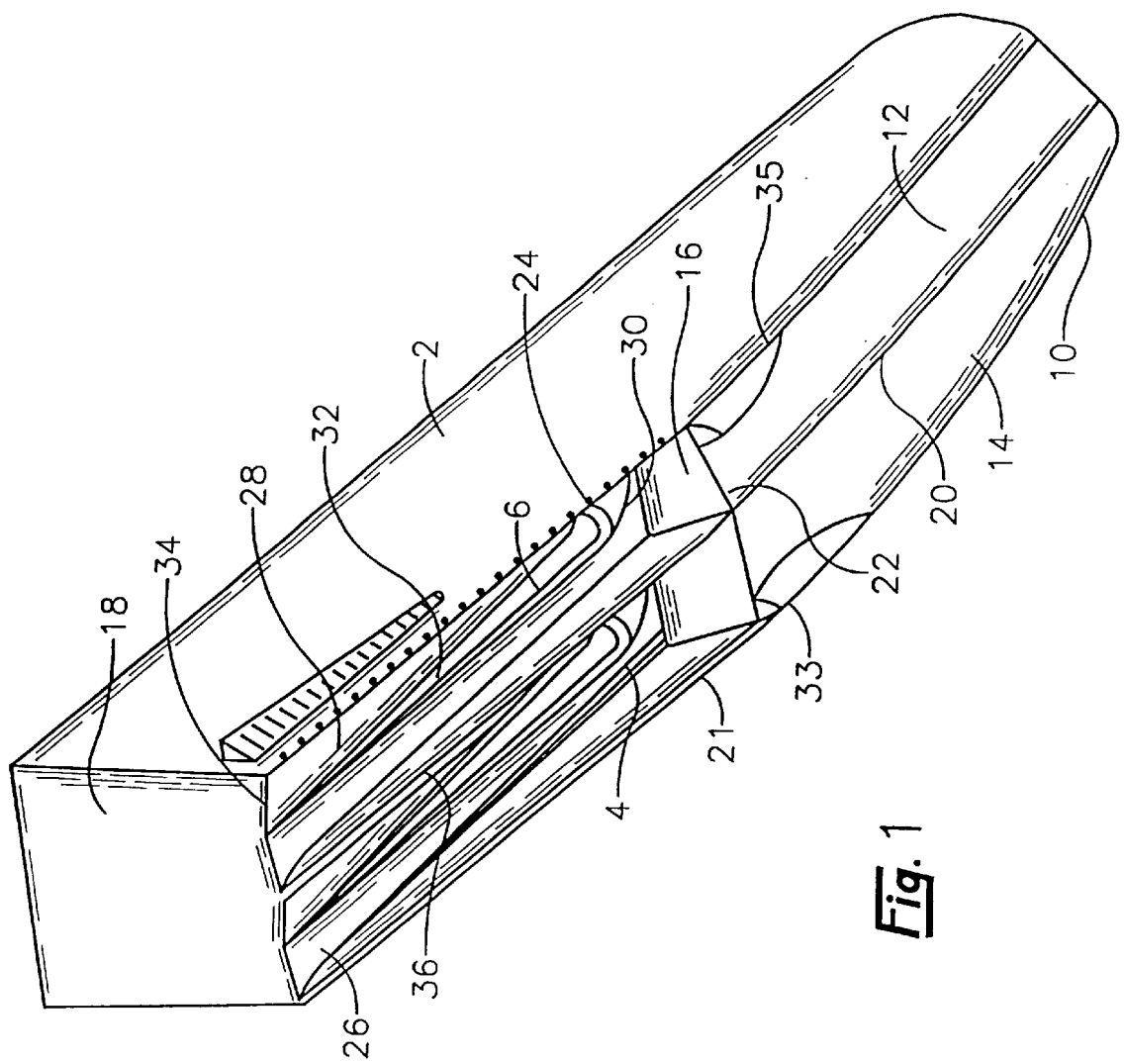
FIG. 1 is a three dimensional view of the bottom of a hull having dual longitudinal air cavities in accordance with the present invention.

Turning now to FIG. 1, a three dimensional view of the bottom of a boat hull 2 having dual longitudinal air cavities 4 and 6 and a variety of other attributes of the present invention is shown. The longitudinal starboard side air cavity 6 and the longitudinal port side cavity 4 are located aft of the bow 10 of the hull 2. The hull 2 is preferably a deep V-hull having relatively highly sloped front side sections 12 and 14 that rise up from the vertex 20 of the V-shaped hull 2 as previously discussed. The slope of front side sections 12 and 14 of the hull 2 decreases gradually from the bow 2 to a transition region 16. On the bow side edge of the transition region 16, the bottom of the hull 2 slopes upward from a leading edge 22 to form a bow side area of the starboard 6 and port 4 air cavities. While the transition region 16 is shown in FIG. 1 as being positioned near the center of the boat hull 2, it is appreciated that the location of the transition region 16 may be varied further toward the aft or bow of the vessel to accommodate a variety of factors such as the weight distribution of the particular vessel on which the present invention is being utilized.

A preferred way to minimize the effects of side venting in accordance with the present invention is to longitudinally divide the air compartments of a surface effect vessel. Longitudinally dividing the air compartments, such as shown in FIG. 1, minimizes the effect of side venting by only allowing air from one of the longitudinal compartments to vent under a variety of conditions. Thus, a portion of the air cushion under the hull remains intact and the increase in the drag of the hull of the vessel in the water is minimized. Thus, lurching and slowing of the vessel due to the venting of air from the supporting air cushion are correspondingly minimized.

One condition under which side venting is likely to occur is during hard turns. As the surface effect vessel turns, the outer edges of the hull on the inside of the turning radius may rise in the water. If the amount of rise is sufficient, the bottom edges of the side hulls will rise out of the water and the air cushion will vent causing the cushion to lose pressure and volume. This venting results in the adverse affects upon the surface effect vessel's performance that were previously discussed. Longitudinally establishing multiple air chambers reduces the adverse effects of side venting by limiting the extent to which the air cushion collapses. For example, during a hard turn only the outermost longitudinal air chamber will vent, leaving the air cushion in the remaining inner longitudinal air chamber intact. Thus, the provision of longitudinally divided air chambers minimizes the undesirable effects of side venting.

Preferably, air vents and blowers are arranged such that the air pressure in the multiple longitudinal air chambers 4 and 6 is independently adjustable. Providing multiple longitudinal air chambers 4 and 6 having independently adjustable air pressures allows an operator of the vessel to compensate for any tendency for the vessel to lean to one side or the other due to any one of a variety of conditions such as turning or imbalanced loading. Thus, the provision of multiple longitudinal air chambers with independently adjustable air pressures allows tilting of the vessel to be compensated for and overcome. Furthermore, as discussed in more detail below, the amount of air pressure in the longitudinal air chambers can be automatically controlled by a gyroscope type leveling system that uses the horizon as a reference. Automating the leveling process reduces the demands made upon an operator of the vessel.

The ability to independently adjust the air pressure in the longitudinal air chambers 4 and 6 may also be utilized to steer the surface effect vessel. For example, when a surface effect vessel such as that shown in FIG. 1 is moving at a high rate of speed, decreasing the air pressure in the starboard air chamber 6 will cause the starboard to make contact with water increasing the drag on the starboard side of the vessel. This increase in drag will cause the vessel to turn in the starboard direction. The independently adjustable pressures can further be utilized with traditional steering methods to increase the safety and comfort of the vessel when making of turns. Thus, the provision of dual longitudinal air chambers having independently adjustable air chambers in a surface effect vessel provides significant advantages over the prior art by improving the stability and handling characteristics of the vessel.

The present invention also comprehends an embodiment wherein the air cushion region of the surface effect vessel's hull is longitudinally divided into a plurality of air chambers by multiple dividing portions similar to the dividing portion 36 in FIG. 1 that runs longitudinally along the underside of the boat hull. As discussed above, dividing the air cushion longitudinally provides a number of benefits. In addition, another benefit of multiple longitudinal air cavities may be observed in the performance of a surface effect vessel in choppy or rough seas. In rough seas, the surface effect vessel may tend to roll from one side to the other. If the degree of roll is sufficient, the side hulls may temporarily be raised out of the water and thereby allow air from the supporting air cushion to vent. When the air vents, the air cushion is temporarily lost and the boat hull falls into contact with the water. As previously discussed, this results in an increased amount of drag and a corresponding decrease in the vessel's performance. However, the provision of multiple longitudinal air chambers minimizes the amount of air that escapes from the air cushion by limiting the venting to the exposed longitudinal air chamber.

One way in which to prevent air from escaping under the above discussed conditions is to increase the depth to which the side hulls 21 and 24 extend into the water. However, increasing the depth of the side hulls 21 and 24 results in an increased amount of drag and thereby decreases the operating efficiency of the vessel. In addition, as their size increases, the side hulls 21 and 24 begin to function more and more as keels which will hamper the maneuverability and shallow water performance of the surface effect vessel.

As previously discussed, the preferred hull of a boat in accordance with the present invention is generally V-shaped and slopes upwardly from the water's surface near the bow. Near the bow 10 the sides of the V-shaped hull are steeply sloped with respect to the water's surface. However, the V-shape of the hull widens to a greater extent toward the aft of the hull. The angle between the legs of the V and an imaginary plane parallel to the water's surface that passes through the apex of the V shrinks from the bow 10 to the beginning 22 of the air cavity region. Preferably, this angle, which we will be referred to as the dead rise angle, is greater than approximately 25 degrees at the intersection of the V-shaped hull and the bow side edge of the air cavity region. Experience has shown that a boat having a V-shaped hull with a dead rise of greater than about 25 degrees in this region provides optimal performance by slicing through the waves and deflecting wave energy away from the boat instead of riding over the wave peaks and exposing the edges of the supporting air cushion.

Figure 2A:
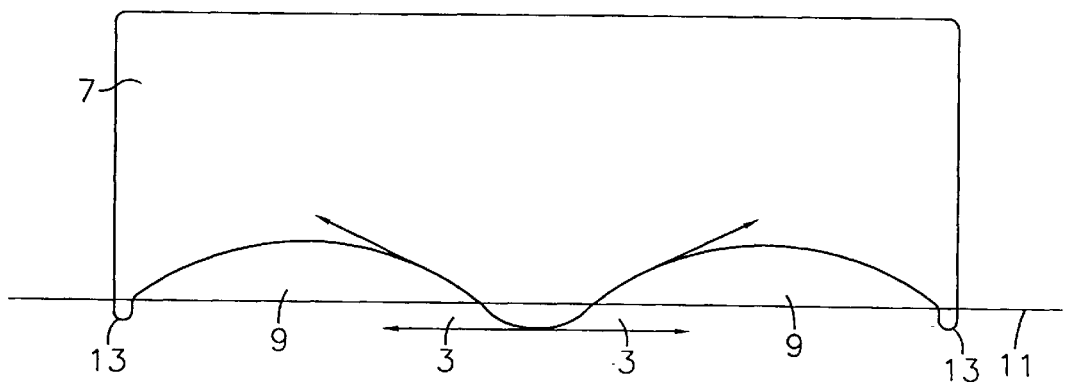
FIGS. 2(a) and (b) illustrate two cross sectional views of hulls having different dead rise angles.
Figure 2B:
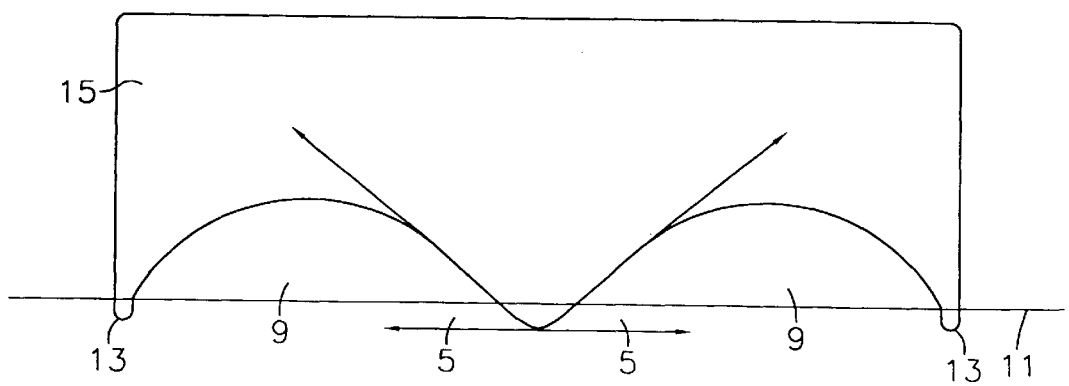

FIG. 2(a) shows a front view of the bow of a boat having a relatively low dead rise angle 3 of approximately 20 degrees while FIG. 2(b) shows a front view of the bow of a boat having a relatively high dead rise angle 5 of approximately 30 degrees. The V-shape of the hulls 7 and 15 shown in FIGS. 2(a) and (b) creates blow through areas 9 between the hulls 7 and 15, the water's surface 11, and the sealing side hulls 13 when the hulls 7 and 15 rise in the water due to an increase in speed. As can be seen in FIG. 2(b), the hull 15 having the deeper dead rise angle 5 creates larger blow through areas 9 at a given speed than the hull 7 having a shallower dead rise angle. A preferred embodiment of the present invention has a bow with a dead rise angle greater than 25 degrees. However, it will be readily appreciated that the present invention will also provide benefits when used with a wide variety of dead rise angles.

Vessels having a deep V-shaped hull with a dead rise greater than about 25 degrees provide improved ride qualities at the expense of low speed planing and fuel efficiency. In particular, a deep V hull configuration improves high speed handling by using the bow of the hull to cut through or pierce waves and the sides of the hull to deflect the wave energy away from the vessel. Wave piercing projections may be provided on the bow to further facilitate the piercing effect of the deep V hull configuration. However, as discussed above, the relatively deep V-shaped hull 15 creates larger blow through areas 9 than the relatively shallow V-shaped hull 7.

Referring back to FIG. 1, the slope of the front side sections 12 and 14 with respect to the plane of the water upon which the hull 2 will be traveling near the leading edge 22 of the air cavities 4 and 6 may be referred to as the dead rise angle of the hull 2 as previously discussed. A hull in accordance with a preferred embodiment of the present invention has a dead rise angle greater than 26 degrees. A large dead rise angle is desirable because it improves the high speed performance of the hull 2. As the speed of the hull 2 across the water's surface increases, the force of the water acts upon the front side sections 12 and 14 of the hull and causes the hull 2 to rise up with respect to the water's surface. Thus, a decreased portion of the hull 2 rest upon the water's surface at high speeds. This reduces the high speed effects of friction upon the hull 2.

In addition to reducing the high speed effects of friction upon the hull 2, the deep v-shape of the hull 2, deflects wave energy to the sides of the hull 2 when the hull is operating in waves. By deflecting the wave energy to the sides, the relatively highly sloped front side sections 12 and 14 allow the hull to slice through waves instead of riding over the waves. This deflecting effect is especially important for improved ride characteristics when the hull 2 is traveling across the water at high speeds. Thus, the deep V-shaped hull 2 provides a number advantages during high speed operation of the hull.

As previously discussed, side hull projections 21 and 24 are placed longitudinally along the sides of the air compartments in the vessel's hull. These side hulls extend a distance down in the water to form a seal which helps prevent gas from the air cushion from escaping from underneath the vessel. However, in conventional surface effect ships, substantial quantities of air will escape from the sides of the V-shaped hull when the boat speed increases and the boat hull rises out of the water and exposes the edges of the frontal portions of the air compartment. This effect is due to the fact that as the boat rises out of the water, the leading edges, or forward seal, of the side hulls 21 and 24 that contain the air cushion correspondingly rise with respect to the water. Thus, as discussed in more detail below, a blow through area is created on each side of the V-shaped hull between the legs of the V and the leading edge of the side hulls 21 and 24. This excessive blow through problem is especially exaggerated in a large ship such as a ferry. For example, a moderately sloped V-shaped hull with a dead rise angle of 15 degrees and a beam of 20 ft will present a blow through area that is a maximum of 2.7 ft high on each side of the V and a deep v-hull having a dead rise angle of 26 degrees and a beam of 20 ft will present a blow through area that is a maximum of 4.9 ft high.

The above discussed embodiment of the present invention controls and directs the water flow and pressure at the forward water/air boundary of the hull 2 such that a V-hulled bottom can be efficiently used with moderate to deep dead rise angles. By controlling the water flow at the forward air/water boundary, the present invention provides an improved rough water ride and improved control of the pressurized gas cushions as compared to prior art surface effect vessels.

In order to minimize and substantially alleviate the above discussed blow through areas and corresponding air venting problems, the present invention utilizes shaped side hull sections 33 and 35 to channel water toward the blow through holes. The shaped side hull sections 33 and 35 are preferably placed in line with the leading edges of the side hulls 21 and 24 and have a shape which channels water toward the blow through areas. Thus, as the boat speed increases, water deflected by the side hull sections 33 and 35 forms a water plug in the blow through areas which prevents air from the cushion from venting and causing the air cushion to collapse. While the shaped side hull projections are discussed with respect to multi hulled vessels and vessels having multiple air cushions or compartments, it is explicitly recognized that they can be used just as effectively with a mono hulled vessel having a single air cushion. Furthermore, while the shaped side hull projections are discussed with regard to a deep-V hull configuration, it is also readily appreciated that the side hull projections are useful for minimizing the effects of blow through areas created by any other hull configuration such as a shallow V.

Thus, an opportunity for air to escape from the air compartment of a surface effect vessel arises from the V-shape of the hull. As boat speed increases, the sides of a V-shaped hull rise out of the water causing the footprint of the boat hull in the water to narrow. When the footprint narrows to the point that the edges of the side hulls and, thus, the edges of the air compartments are lifted, blow through areas are created on the sides of the air compartment. These blow through areas correspond to locations where the pressure of the water is less than the pressure of the air inside of the air compartments. When air escapes from the air compartments through the blow through areas, the air cushions begins to collapse. Correspondingly, an increased amount of drag is experienced by the surface effect vessel. This increase in drag may cause the vessel to experience changes in speed.

The present invention compensates for the above discussed edge effects by placing a pair water directing projections on the boat hull surface. The water directing projections 33 and 35 are preferably placed forward of the leading edge of an air compartment on the side hulls that contain the air cushion under the boat hull as shown in FIG. 1. The water directing projections 33 and 35 produce a high velocity column of water that is directed toward the blow through areas on the side portions of the air compartment. This high velocity water flow from the water directing projections 33 and 35 creates water plugs in the blow through areas. These water plugs substantially oppose the pressurized air attempting to vent through the blow through areas and, thus, prevent excessive venting. Thus, the side hull water directing projections 33 and 35 decrease the extent to which air can escape through the blow through areas and vent from the supporting air cushion.

If a deep V-shaped hull without side hulls having the water directing portions 33 and 35 is used for a vessel, the vessel will have a lower than normal terminal speed. As surface effect vessels are typically designed to be high speed vessels, a decrease in their top speed is often considered a significant drawback. The shaped side hulls also provide an increased amount of hydrodynamic lift to the hull at low speeds by directing water in an upward fashion into the hull as will be discussed in more detail below. In addition, when used in conjunction with a mono hulled surface effect ship, the side hulls can be widened to stabilize the vessel by minimizing side to side rocking of the hull.

The side hulls and forward keel areas discussed above are preferably built strong enough to withstand major wave impacts. In addition, the side hulls 22 and 24 are preferably strong enough to act as frontal guards or surfaces that can withstand occasional impacts with sand bars, floating objects and/or mud bottoms. When a collision occurs, the side hulls function to carve into the mud or sand before the rest of the hull and cushion the impact. Thus, the side hulls can also be used to minimize damage during a low speed grounding of a surface effect vessel.

Applicant has further discovered that by sloping the transition region 16 on a hull such as that shown in FIG. 1, low speed resistance can be minimized without substantially compromising the top speed of a vessel for a given power input. The transition region 16 preferably slopes upward from the water's surface at an angle less than 80 degrees when the hull 2 is resting in the water. More preferably this angle is less than 60 degrees. However, it is appreciated that the optimum value of this angle will vary to a degree based upon the speed, weight distribution and particular construction of the hull 2. It should also be noted that the transition area 16 can be shaped in a curved fashion so that different portions of the transition area 16 have different slopes. However, in the preferred embodiment, the transition area 16 is not substantially perpendicular to the water's surface. Conventional surface effect boat designs fail to teach constructing the leading edge of an air cavity such that it slopes upward from the bottom of the hull. An unsloped transition area causes the water's surface to break cleanly from the hull 2 at high speeds. However, as discussed in more detail below, an unsloped transition area also causes drag and low speed maneuverability problems in surface effect vessels.

As previously discussed with respect to FIG. 1, a hull 2 in accordance with the present invention has side hulls 21 and 24 that help minimize the amount of gas escaping from the gas cavities 4 and 6. The edges of the side hulls 21 and 24 extend into the water's surface to establish a seal that prevents a portion of the gas contained in the cavities 4 and 6 from escaping. The gas contained in the cavity reduces the amount of surface area on the hull 2 that is in contact with the water's surface. Since the frictional effects of water are greater than those of air, the drag of the hull is decreased and the speed of the hull across the water's surface is increased for any given amount of thrust. Thus, a vessel having a well maintained gas cushion has a higher top speed, smoother ride and is more fuel efficient than a conventional surface effect ship.

The aft edges of the air cavities 4 and 6 slope downward from a higher bow area 30 to a lower aft area 32. The aft most edge 34 of each of the air cavities 4 and 6 preferably forms a relatively shallow single or multiple inverted V-shape The force of water coming into contact with aft most edge 34 establishes an aft seal that inhibits air from escaping from the air cavities 4 and 6. While experience has shown the shallow inverted V-configuration to be preferable, it is appreciated that other transom configurations such as a straight aft most edge 34 are also satisfactory.

Another important aspect of an embodiment of the present invention is illustrated in FIG. 3. In FIG. 3, a hull construction 46 of the present invention is depicted having two longitudinal gas cavities 38 and 40. The hull is V-shaped with sloped bow sections 42 and 44 which slope generally upward from the water's surface. The aft portions of the sloped bow sections 42 and 44 form a port side 50 and a starboard side 48 leading edge of the gas cavities 38 and 40. The port and starboard side leading edges 50 and 48 substantially follow the contour of the hull construction 46. Thus, the leading edges 48 and 50 form a V-shape having a dead rise angle of approximately 15 degrees with respect to the plane of the water's surface.

Side hull seals 52 and 54 run parallel to the gas cavities 38 and 40. The side hulls seals increase the amount the hull 46 can rise in the water before the edge of the gas cavities 38 and 40 lift from the water's surface thereby causing the pressurized gas in the gas cavities 38 and 40 to vent. When venting occurs a larger portion of the hull's surface area comes into contact with the water's surface. As previously mentioned, this is typically experienced as a lurching or slowing of the vessel due to increased frictional resistance. Thus, by preventing gas from escaping from the gas cavities 38 and 40, the side hull seals 52 and 54 improve the performance of the vessel, especially at higher speeds.

FIG. 3 also clearly depicts a vessel hull having water redirecting structures 56 and 58. The water redirecting structures 56 and 58 channel water towards blow through areas 60 and 62. The blow through areas 60 and 62 are created when the hull's speed through the water causes the hull to rise in relation to the water's surface to the point that portions of the front seal of the gas cavities 38 and 40 lose contact with the water'surface. The water redirecting structures 56 and 58 redirect a portion of the water from an area of the hull in contact with the water's surface towards the blow through areas that are not in contact with the water's surface at high speeds. The water redirecting structures 56 and 58 thereby maintain the forward seal of the gas cushion.

While the water redirecting structures 56 and 58 shown in FIG. 3 are passive, its is readily appreciated that dynamic water directing structures such as pressurized water pipes could be used to create a water flow directed toward the blow through areas 60 and 62. The provision of dynamic water directing structures allows the area at which the water flow is directed to be automatically or manually manipulated to insure that the water flow is properly directed toward the blow through area. Such direction control can be accomplished, for example, by placing rotatable nozzles on the ends pressurized water pipes. It is appreciated that the provision of dynamic water redirecting structures will increase the cost and complexity of constructing and operating the surface effect vessel. However, since the exact location of the blow through areas 60 and 62 varies with a number of conditions such as the speed of the vessel, the additional cost incurred by the provision of dynamic water directing structures may be outweighed by their benefits in certain applications where it is important to provide optimal performance.

In the embodiment shown in FIG. 3, the water redirecting structures 56 and 58 create a water flow that is directed toward the blow through areas 60 and 62. An effective water plug is created that allows the hull 46 to rise higher above the water's surface before the gas cavities 38 and 40 vent. Thus, the top speed which the vessel can obtain without causing the air cushion to vent is increased. Prior art hulls are deficient in that they fail to compensate for blow through areas that are created when the hull moves through the water in choppy conditions.

FIG. 4 illustrates yet another embodiment of water redirecting means. The water redirecting protrusions 68 and 70 are located on a vessel's hull forward of a pair of longitudinal air cushions 72 and 74. As can be clearly seen in FIG. 4, the water redirecting protrusions extend downward from the hull and are in front of the air cushions 72 and 74. Thus, the water redirecting protrusions 68 and 70 create directed water flows which establish or maintain water contact at predetermined locations on the vessel's hull and control the optimum ride height of the vessel.

Figure 5:
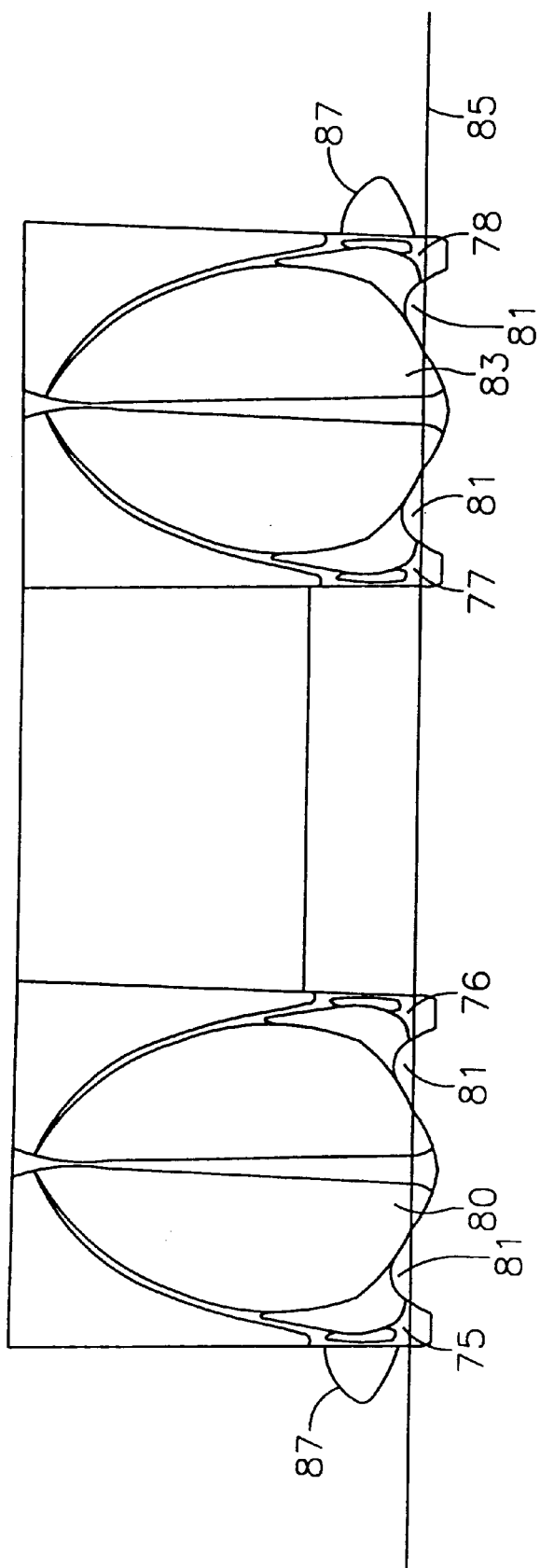
FIG. 5 is a three dimensional bow view of a catamaran having bow mounted water redirecting portions.

FIG. 5 illustrates yet another embodiment of a water redirecting hull configuration. The water redirecting means 75, 76, 77 and 78 are placed near the dual bows 80 and 83 of a catamaran-like vessel. This is because the blow through areas 81 created between the water's surface 85 and the bows 80 and 83 of a deep V-hulled large vessel configured as shown in FIG. 5 tend to occur relatively close to a bow-side edge of the air cavities. It is appreciated that the embodiment of FIG. 5 could be used to impede venting from the sides of a single gas filled recess or from the outer most edges of multiple longitudinally aligned recesses.

FIG. 6 clearly depicts a cut away side view of a vessel having an air recess 82 with a sloped leading edge 84. A straight line drawn from a lowest point 88 of the leading edge 86 to a highest point 90 of the leading edge 84 forms an angle 86 with respect to the edge of a recess side hull 92. By selectively manipulating the angle 86, low speed performance can be dramatically improved without significant decreases in the vessel's top speed. This is largely due to the effect illustrated in FIG. 7.

FIG. 7(*a*) depicts a vessel 94 having an air cavity 96 with an unsloped leading edge 98. At low sub planing speeds before the air pressure in the air cavity has reached a level sufficient to force the water from the leading edge 98 as depicted in FIG. 7(*a*), a considerable amount of water turbulence 100 is created about the leading edge 98. Due to the power required to overcome the increased drag resulting from the high level of turbulence, the time required for the vessel 94 to reach a planing speed such as depicted in FIG. 7(*b*) is correspondingly increased. In addition, due to the increased level of turbulence at low speeds, the vessel will tend to wander off course and is hard to maneuver. However, an unsloped fairing 98 as shown in FIG. 7(*b*) does provide for a clean break between the air in the air cavity and the water 100 at high speeds.

An embodiment of the present invention having a sloped fairing 102 is depicted in FIG. 7(*c*). The sloped fairing 102 allows the water 100 to flow relatively smoothly over the vessel's 104 hull when the vessel's air cavity 106 is not pressurized at low speeds. The sloped fairing 102 also further minimizes blow throughs or venting at transition speeds. In addition, the additional friction incurred due to the sloped leading edge of the fairing 102 at higher speeds as shown in FIG. 7(*d*) has been experimentally determined to be insignificant when compared to the unsloped fairing 98. Thus, the low speed advantages of the sloped fairing 108 often outweigh the sloped fairing's high speed disadvantages. This is particularly true for larger vessels, such as yachts, ferries, and tour craft which are often more concerned with low speed performance and handling than the absolute highest top speed possible.

The present invention further comprehends that the sloped fairing 102 may be provided with a critical speed protrusion 110 which causes the water's surface 100 to form a boundary with the air cavity 106 at a certain location throughout a predetermined range of speeds as shown in FIG. 7(*e*). Thus, a cruising speed range is established between which the water/air boundary will be formed at the critical angle protrusion for any given air pressure in the air cavity 106. When operating within this cruising speed range, the critical speed protrusion 110 functions to facilitate separation of the water's surface from the hull of the vessel 104 and thereby decrease friction between the vessel and the water 100. The critical angle protrusion 110 further functions to control venting from the bow edge by establishing a firm seal at the water/air boundary. While a single critical angle protrusion is preferred, it is appreciated that the sloped fairing 102 may be provided with a series of critical angle protrusions which establish a series of cruising speeds.

A bottom view of another embodiment of a hull configuration of the present invention having an aft air cavity 112 and a bow air cavity 114 is shown in FIG. 8(*a*). A separation portion 116 is located between the aft air cavity 112 and bow air cavity 114. At low speeds the separation portion 116 substantially prevents gas exchange between the aft 112 and the bow 114 air cavities. This allows the pressure to be independently adjusted in the aft 112 and the bow 114 air cavities at low speeds. Thus, the tendency of a boat having a rearwardly mounted engine to ride lower in the water in the aft region when taking off can be overcome by introducing a relatively high air pressure in the aft air cavity 112 and a relatively low air pressure in the bow air cavity 114 during take off. Adjusting the pressures in this manner causes the boat to reach a planing speed sooner and decreases the water's resistance encountered during its over the hump speed.

The separation portion preferably has a lower edge 118 that is positioned such that it is lifted up and separates from the water's surface at higher speeds as in the embodiment shown in FIG. 8(*b*). As is clearly illustrated in the side view of FIG. 8(*b*), a restriction area 120 containing high pressure gas moving at an increased velocity is created between the lower edge 118 of the separation portion and the surface of the water 126. Due to the direction of water flow, gas tends to flow from the bow air cavity 128 through the restriction area 120 to the aft air cavity 122. However, temporary increases in the aft air cavity 122 air pressure caused by conditions such as rough water or heavier aft loads may cause air to flow from the aft air cavity 122 through the restriction area 120 to the bow air cavity 128. Thus, the separation portion 116 may perform a cushioning and damping function under some circumstances. In addition, by not contacting the water's surface at higher speeds, the separation portion 116 produces less drag and is more efficient than a water contacting separation portion. The flow of air through the restriction area 120 can further be automatically manipulated through manipulations in the amount of air introduced into the bow 128 and aft 122 air cavities through their respective gas ducts 130 and 132.

In an especially preferred embodiment, the bow 128 and aft 122 air cavities and the separation portion 116 further function together to minimize the effects of venting at higher speeds. If air is vented from the bow cavity 128, the reduced gas pressure will cause the air cushion in the bow cavity 128 to vent. Gas will naturally attempt to move from the aft air cavity 122 through the restriction area 120 and into the venting bow air cavity 128. However, as the air cushion in the bow air cavity 128 vents, the bottom edge 118 of the separation portion 116 temporarily comes into contact with the water's surface and establishes a seal which substantially decreases the loss of air from the aft air cavity 122. Thus, a smaller portion of the hull's surface comes into contact with the water's surface and the above discussed lurching effects are diminished.

While the separation portion 116 has been discussed with respect to a bow and aft air compartment, it will be readily appreciated by one skilled in the art that the above discussed separation portion could also be utilized with longitudinal air cavities such as shown in FIG. 1. Furthermore, it is contemplated that the above discussed bow and aft compartments can also be utilized in conjunction with multiple longitudinal air compartments.

As discussed with respect to FIG. 8(*b*), a preferred embodiment of the present invention includes a divided air cavity having a forward air compartment and an aft air compartment. The forward air compartment is separated from the aft air compartment by a dividing section. As the boat begins to operate, pressurized air from a blower is forced into the forward and aft air compartments. Air may be introduced into the forward and aft compartments by a single air inlet in each cavity or through multiple air inlets in each cavity. The introduced air in the forward and aft air compartments separates portions of the boat's hull from the water's surface and, thus, decreases the friction between the boat hull and the water.

As the boat of FIG. 8(*b*) begins to move, the force of the water upon the portions of the boat hull contacting the water increases. Thus, the boat hull begins to rise out of the water thereby decreasing the surface area of the boat hull which is in contact with water. Furthermore, as the speed of the boat increases, the point at which the bow of the boat contacts the water moves farther aft. Thus, a high rate of speed might result in the front of the boat hull lifting out of the water to a point where the leading edge of the air cavity is lifted out of the water. At that point, the air cushion in the air cavity is released, and the inside of the air cavity comes into contact with the water. This venting of the air cushion results in a dramatic and rapid increase in the frictional footprint of the boat and causes the boat to slow down.

By maintaining multiple air cushions separated by dividers perpendicular to the direction of motion, the present invention minimizes the amount of air which escapes under the above described venting situation. For example, when a boat having a hull as shown in FIG. 8(*b*) speeds up the footprint of the boat hull in the water begins to decrease. When the boat hull rises out of the water enough to expose the forward cavity, the supporting gas in the forward air cavity is released and the footprint of the boat in the water increases. However, the dividing section prevents the air from the aft gas compartment from escaping. Thus, the increase in the size of the boat's footprint and the corresponding increase in drag is reduced by the presence of the dividing section. It will be readily appreciated by one skilled in the art that multiple air compartments may be established by providing multiple dividing sections in the hull to further limit the amount of air which escapes under the high speed fault condition discussed above.

In an especially preferred embodiment of the present invention, the multiple transverse air compartments have separate air ducts and pressure controls that allow an operator of the surface effect vessel to independently adjust the air pressure in the compartments. Alternatively, the ducts and air pressure may be predetermined during the manufacturing process to provide the best operating characteristics for a particular application and, thereby, decrease the cost and complexity of the vessel. However, allowing independent control of the air pressure allows the operator to manually, or a computer to automatically, compensate for a number of undesirable situations. As previously discussed, one such situation occurs upon start up of the surface effect vessel. When the surface effect vessel begins to move, the aft of the vessel is typically resting lower in the water due to the increased amount of weight in the aft section. This increased weight is often due to the placement of the engine and/or the blowers near the aft of the vessel. Because the aft portion of the vessel is riding lower in the water, the vessel will tend to take off slowly until the force of the water on the hull causes the aft portion of the boat to rise and the bow drops. This condition is commonly referred to as the vessel going over the hump or planing out. The present invention minimizes this effect by allowing an operator the vessel to increase the air pressure in the aft most air chambers relative to the bow air chambers. The increased air pressure in the aft compartments causes the aft section of the surface effect boat to rise much earlier in the take off cycle. Thus, the surface effect vessel of the present invention planes out much earlier and a reduced amount of time and force are required to place the vessel in this condition. The previously discussed hook angle projections may also be employed in a similar manner to help the vessel plane out. It will be appreciated that the present invention can also readily accommodate situations in which it is desirable to raise the bow of the surface effect vessel by increasing the air pressure in the bow air compartments relative to the aft compartments. Furthermore, the pressure in the bow and aft compartments can be automatically controlled by an autopilot type device which utilizes a gyroscope to sense the attitude of the vessel with respect to the horizon and maintains the attitude in accordance with a plurality of predetermined operating conditions.

The dividing portion between the multiple transverse air compartments is preferably constructed such that at moderate to high speeds a narrow air channel exists between the dividing portion and the water's surface. This air channel allows an amount of air to flow between the multiple chambers. Due to the direction in which the surface water is moving with respect to the vessel's hull and the direction in which air is introduced into the air compartment, air will tend to flow from the air compartments closest to the bow to the air compartments in the aft. Furthermore, because the air channel is narrower than the air compartments and forms a restriction in the air flow between the compartments, the air pressure in the air channel will be higher than the air pressure in the air chambers. This high pressure in combination with the direction of flow of the air from the bow sections to the aft sections, tends to minimize air flow from the aft chambers to the bow chambers. In addition, if the bow chamber was to vent and cause the bow air cushion to temporarily collapse, the hull will fall toward the water until the dividing portion comes into contact with the water's surface. The dividing portion will then function as a seal to prevent the aft air compartment from venting through the bow air compartment. Thus, the dividing portion helps minimize venting of the air cushions without out adding drag to the hull by being in contact with the waters surface at relatively higher speeds. While the above discussed dividing portion is designed not to be in contact with the water's surface at all times, particular embodiments of the present invention, wherein it is desired to substantially prevent gas exchange between the air compartments, may utilize dividing portions that are designed to be in substantial contact with the water's surface throughout the vessel's speed range. In addition, the present invention recognizes that a dynamic sealing member may be placed on the bottom edge 118 of the separation portion 116 such the size of the restriction area 120 may be automatically or manually adjusted by an operator of the vessel. By controlling the size of the restriction area 120 with a dynamic sealing member, an operator of the vessel can control the pressure differential between the bow and aft air compartments.

Another problem encountered with surface effect vessels is the tendency for water to be forced into the air inlets or gas ducts when the hull is forced against the water's surface. Thus, to prevent water from being forced into the air vents when the air cushion collapses and to direct the flow of air from the vents toward the aft of the surface effect vessel, air flow direction protrusions 123 and 125 are preferably provided on the bow side edges of the gas ducts 130 and 132 shown in FIG. 8(b). Preferably, the gas ducts, or air vents, 130 and 132 are located in the bow side portions of the air chambers. Thus, the air flow direction protrusion 125 for the aft side air compartment may be placed on the aft side of the bottom edge 118 of the separation portion. While the above discussed gas duct placement is preferred, it is appreciated that the gas ducts can be placed in any location inside the air compartments.

It will be appreciated that the speed at which the walls of the forward air compartment will be separated from the water causing the air cushion to vent depends upon the placement of the forward air cushion. It will further be appreciated that the effect of the loss of air pressure in the forward compartment will depend upon the size of the forward compartment in relation to the size of the aft compartment. In order to maximize the effectiveness of the multiple air compartments, the present invention comprehends an embodiment wherein a separation portion, such as separation portion 116 in FIG. 8(a) can be manually or automatically adjusted to a farther forward or farther aft position. Such an adjustable separation portion 116 allows a user of the boat to adjust the relative sizes of the forward and aft air compartments to compensate for varying conditions. Thus, the separation portion of the present invention provides a substantial benefit over the prior art.

As previously discussed with respect to the multiple transverse air compartments, the present invention also comprehends that the dividing portion between the longitudinal air compartments shown in FIG. 1 can be mounted on the hull such that the relative sizes of the port side and starboard side longitudinal air compartments can be adjusted by an operator of the vessel.

As previously discussed with regard to FIGS. 7(a–e), another improved feature of the surface effect vessel of the present invention resides in the leading bow side edge of the air compartments. Providing a leading bow side edge that is roughly perpendicular to the water's surface improves the high speed performance of the craft by providing a cutting edge which facilitates separation of the water surface from the hull. However, at lower speeds, water will tend to irregularly rise up around the perpendicular leading edge and create a turbulent suction area which leads to decreased stability and control of the vessel. Thus, the vessel tends to wander of center and constant course corrections are required. This highly turbulent back flow also tends to result in increased resistance to forward motion at speeds lower than the planing speed of a vessel.

In addition to the above discussed problems, a substantially perpendicular water separation fairing may cause so much turbulence and increased resistance that the engines of the vessel are unable to produce enough power for the vessel to get over the hump and attain its planing speed and overcome the turbulence. Thus, the low speed hydrodynamics of the hull bottom are critical if efficiency and straight line tracking of the vessel is to be maintained.

In order to provide the surface effect vessel of the present invention with improved low speed handling characteristics, the leading edge of the air compartments is sloped upward from the waters surface at an angle less than 90 degrees to form a water separation fairing. Preferably the angle of the slope of this edge is less than 70 degrees. However, it is appreciated that the most desirable angle for the separation fairing will depend upon factors such as the weight of the vessel and its desired cruising speed. The sloped fairing angle of the present invention improves the transition between the water supported and air supported sections of the hull of a surface effect vessel.

The sloped leading edge of the air compartments also allows water to flow smoothly into the air chamber and past the air vents without creating a substantial amount of drag producing turbulence at low speeds. In addition, a separation protrusion is preferably provided on the upwardly sloping hull surface in order to facilitate separation of the water surface from the hull surface at higher speeds. Thus, the hull configuration of the present invention improves low speed performance without significantly affecting high speed performance. Therefore, a surface effect vessel having a sloped fairing angle is adapted to provide a quality ride as opposed to an absolute highest possible top speed such as would be desirable for a racing boat.

Figure 7A:
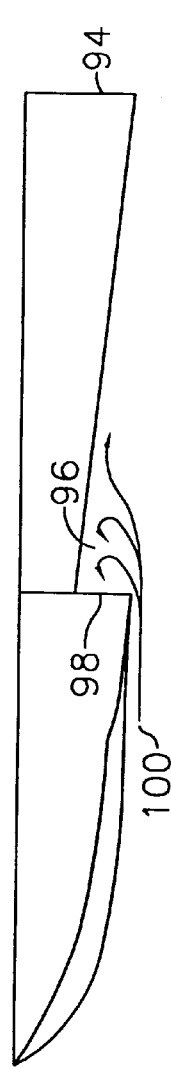
FIGS. 7(a–e) illustrate the benefits of a sloped transition region and a critical speed protrusion.
Figure 7B:
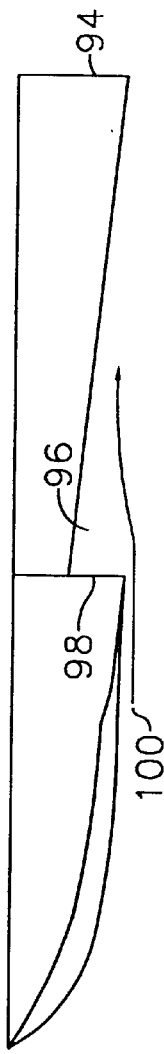
Figure 7C:
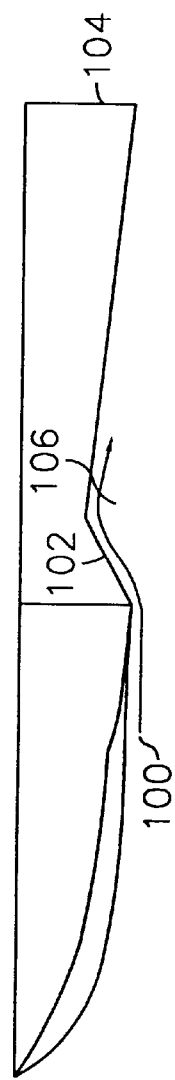
Figure 7D:
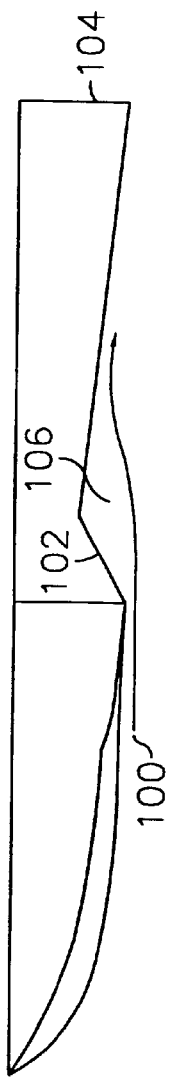
Figure 7E:
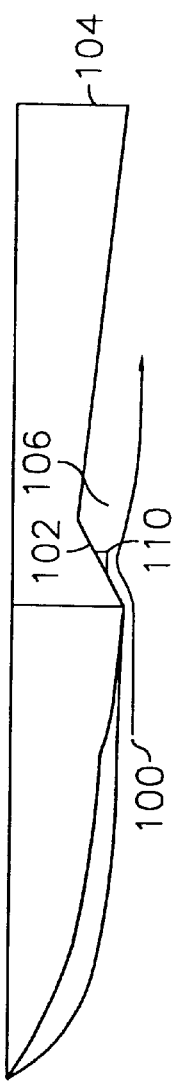

As discussed with respect to FIG. 7(e), the present invention further comprehends a critical angle protrusion placed on the upwardly sloping leading section of an air cavity. As the boat begins to move forward, water flows along the upwardly sloping edge of the air cavity until it reaches a point at which the water surface parts from the surface of the boat hull in the cavity. The point at which the water separates from the boat hull depends upon a number of factors such as the speed of the boat, the slope of the leading edge of the cavity and the air pressure injected into the cavity. Because the water coming into contact with the boat hull causes drag, it is desirable have the water separate from the hull as quickly as possible.

The present invention facilitates the separation of the water from the leading edge by placing a critical angle protrusion along the upwardly sloping edge at a point at which it is desired have the water separate from the hull. This protrusion results in an operating range over which the water will separate from the hull at the same position. This provides for a more constant ride quality in this range of speeds. Thus, the critical angle protrusion of the present invention provides a substantial improvement over the prior art.

Another aspect of the present invention resides in the placement of the engines and the blowers. For many types of boating applications, the most desirable location on the boat is often in the middle portion of the aft of the hull. In order to maximize the amount of available deck space in this aft area, preferred embodiments of the present invention place the blowers to the sides of the vessel's hull. Such a blower placement leaves the aft deck open for activities such as fishing. Ducting may be used to direct the air from a side mounted blower to the air cavity or cavities. In a two-hulled catamaran-like embodiment as shown in FIG. 9, dual blowers 134 and 136, one placed to each respective side of the hull, are preferred. This dual blower approach avoids the disadvantages of placing a single blower in the center of the aft portion of the hull and avoids any weight distribution problems incurred from placing a single blower to one side or the other. While a catamaran structure is depicted in FIG. 9, the present invention is equally applicable to multi hulled structures such as a trimarans.

FIG. 9 also depicts a preferred engine 140 and 142 placement of the present invention. The engines 140 and 142 are preferably positioned in close proximity to the blower's 134 and 136 in a manner that allows the blowers 134 and 136 to be efficiently coupled to the engines 140 and 142. In addition, the placement of the blowers 134 and 136 and the engines 140 and 142 in the bottom of the hulls 144 and 146 frees up the deck space on an aft portion 148 of the vessel. Furthermore, the placement of the blowers 134 and 136 and the engines 140 and 142 in the bottom of the hulls 144 and 146 provides the vessel with a low center of gravity for increased stability and an improved weight distribution. With such an engine placement, drive props 149 and 150 may be directly and inexpensively coupled to the engines 140 and 142 and transmissions when the engines are positioned as shown in FIG. 9. Thus, the engine and blower placement of FIG. 9 is preferred because it provides a number of advantages over the prior art. However, it is appreciated that many aspects of the present invention can also be realized in conjunction with a vessel having the blowers and/or additional engines mounted midship or in the bow of the vessel.

Figure 10:
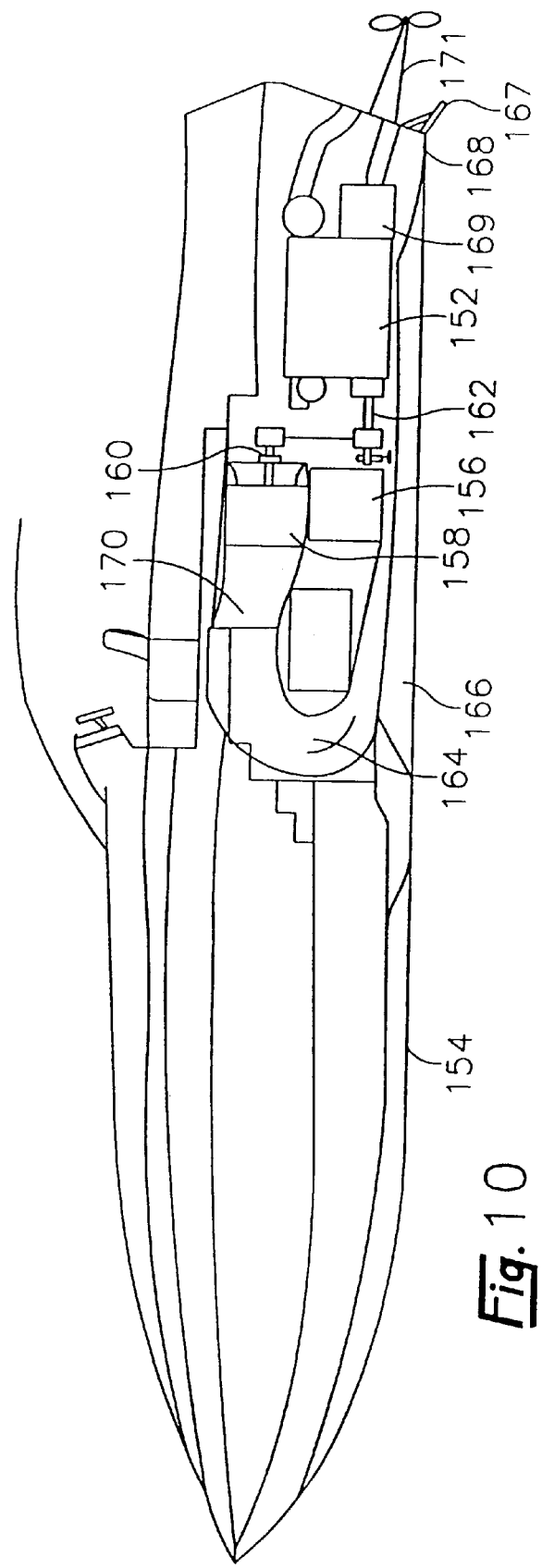
FIG. 10 is a cutaway view of a surface effect vessel having a preferred blower, engine and gas duct arrangement.

FIG. 10 shows a cut away view of a surface effect vessel having an alternative blower placement in accordance with the present invention. The engine 152 is placed towards an aft region of the vessel 154. The blower 158 is positioned with the blower's drive shaft 160 running approximately parallel to the engine's drive shaft 162. As discussed above, the blower 158 placement shown in FIG. 10 allows an inexpensive belt or gear box type coupling to be used between the engine 152 and the blower 158. In addition, placing the engine 152 and the blower in close proximity minimizes the amount of noise reduction shielding that needs to be employed to allow the vessel to operate at a comfortable noise level.

Yet another preferred feature of the present invention is also depicted in FIG. 10. The air passage 164 from the blower 158 to the air cavity 166 introduces air into the cavity 166 with an aftward direction of motion. A duct air flow director 164 can further be utilized to facilitate introduction of air with an aftward direction of flow. In addition, the duct air flow director 164 can further be configured to minimize the introduction of water into the duct when the vessel is operating in reverse or when the air cushions vent as a result of heavy wave impacts.

Experience has shown that introducing the air in this manner, develops forward thrust and establishes a predominately bow to aft airflow in the air cavity 166. This bow to aft airflow may increase the amount of air which escapes from the aft seal 168 of the air cavity 166. However, due to the weight distribution of a typical surface effect vessel in motion, the aft sealing region 168 is often one of the best sealing regions of the air cavity 166. In addition, the backward curve in the air passage 164 minimizes the amount of water which is forced into the air passage 164 when the air cushion in the air cavity 166 collapses or vents. The present invention also comprehends the use of a flapper door 170 that is biased shut or responsive to a reverse flow of air or water to further protect against the introduction of water into the blower 158.

Introducing air into the air cavity with an aftward direction of flow also helps reduce friction by shearing away wave crests in the air cavity 166 that come into contact with the hull. In rough water, the crest of waves in the air cavity 166 may come into contact with the hull. The increased contact between the water's surface and the hull results in increased friction which slows down the vessel and decreases the ride quality. However, introducing pressurized air into the air cavity 166 with a bow to aft motion creates a forced bow to aft air flow. This air flow will tend to shear away water which comes into contact with the vessel's hull above the air cavity 166. Thus, providing the air cavity 166 with a bow to aft air flow improves the performance of the surface effect vessel.

The air/water seal in the aft sealing region 168 can be further maintained by the provision of an adjustable hook angle protrusion 167. The adjustable hook angle protrusion 167 can be adjusted downward to function as a trim tab at low speeds to facilitate lifting of the aft region. At higher speeds the adjustable hook angle protrusion functions as a dynamic sealing member that allows an operator of the vessel to control the water/air seal in the aft sealing region 168.

While not shown in FIG. 10, it is appreciated that if a strong enough air pressure producing means, such as a jet engine, is utilized instead of the engine 152 and blower 158 combination shown, the forward thrust generated due to the direction in which the air is introduced into the air cavity 166 will be sufficient to propel the vessel across the water's surface. In fact, the blower 158 may be the only means by which the surface effect vessel generates thrust. However, the use of jet propulsion may dictate that the interior of the air cavity 166 be constructed such that it can handle the high temperature exhaust or thrust typically generated by a jet engine. In an embodiment as discussed above, the dual longitudinal air cavities 166 may be utilized such that the vessel can be steered by varying the amounts of air introduced into the respective longitudinal air cavities. Similarly, the air pressure under the respective hulls of a catamaran type embodiment may be varied to effectuate steering.

In a most preferred embodiment, the surface effect vessel is equipped with a multi-speed transmission 169 coupled to a surface drive prop 171. The multi-speed transmission 169 provides the vessel with low speed acceleration and a high top speed. Furthermore, the multi-speed transmission 169 allows the engine 152 of the vessel to operate in its optimal rpm range more of the time. This is especially important for a high speed vessel that has a wider range of operating speeds than a traditional vessel, i.e., a high speed ferry operating between 0 and 80 miles per hour. In addition, the multi speed transmission 169 allows a larger more efficient surface drive prop 171 to be used for any given engine 152 size.

As discussed above, blower placement can influence the escape of air from an air cavity in a surface effect boat hull. Blowers that are positioned in a manner such that the air is blown into the air cavity at an angle tend to force an increased amount of air out of the air cavity in a particular region. Therefore, in an alternative embodiment, the present invention provides a blower arrangement such that the air is delivered in the air cavity substantially perpendicular to the water surface. Such a configuration causes the air to be evenly distributed in all directions and contributes to the overall efficiency of the surface effect vessel. In addition, such a blower placement provides a small amount of additional lift to the vessel. A downward aimed blower also tends to create a depression area in the water's surface. This depression can be positioned to counter a rebound hump that may be created by water rising as it passes the bow most seal of the air cavity. It is appreciated that a wide variety of pressurization systems could be used in accordance with the present invention. These types include but are not limited to passive ram type intakes, mixed flow, centrifugal, axial ducted fans, jet engine arrangements, engine exhaust systems, etc.

FIGS. 11(a) and (b) depict a preferred transom and prop configuration for a surface effect vessel in accordance with the present invention. In particular, FIG. 11(a) shows the transom 174 of a surface effect vessel having a shallow dual inverted V configuration 172 with a center mounted surface drive prop 176. As previously mentioned, surface effect vessels tend to allow air to escape from the transom region of the vessel. Introducing changing amounts of air in an unpredictable manner around a prop may cause the prop to ventilate or slip excessively in the water. The dual inverted V configuration 172 of FIG. 11(a) channels air escaping from the aft of the vessel towards the apexes 172 of the dual inverted V hull configuration. Placing the apexes 172 to the sides of the surface drive prop 176 channels escaping air away from the prop 176. Thus, the amount of air around the prop 176 will not depend as heavily upon the varying amount of air escaping from the transom region of the boat. Thus, a vessel having the dual shallow inverted V hull configuration and prop placement of FIG. 11(a) will exhibit more consistent and predictable acceleration and cruising speed characteristics.

The hull configuration of FIG. 11(a) also allows the engine 178 of the surface effect vessel to be placed low in the hull between the inverted V's. Such an engine placement provides an advantageous weight distribution, minimizes the required height of the inner deck and transom 174, and frees up space toward the rear of the vessel. Furthermore, when used in conjunction with a surface drive prop, the hull configuration of FIG. 11(a) positions the engine 178 at the lowest point in the hull such that the surface drive shaft is approximately parallel to the water's surface thereby increasing its operating efficiency.

FIG. 11(a) also illustrates cornering chines 173 provided on the side hulls 175. The cornering chines 173 run along the sides of the side hulls 175 for a portion of the vessels length. The cornering chines 173 act upon the water around the side hulls 175 to produce a stabilizing force that minimizes the amount which the surface effect vessel will roll during a turn. Thus, the cornering chines 173 also minimize the likelihood that the side hulls 175 will drop into the water as the edges 175 dig into the water's surface during hard turns. In addition, the cornering chines 173 act as spray rails which prevent water from spraying onto the vessel. Furthermore, while the preferred embodiment has the cornering chines 173 positioned on the side hulls, it is appreciated that alternative placements of the cornering chines 173 may be utilized.

Figure 11:
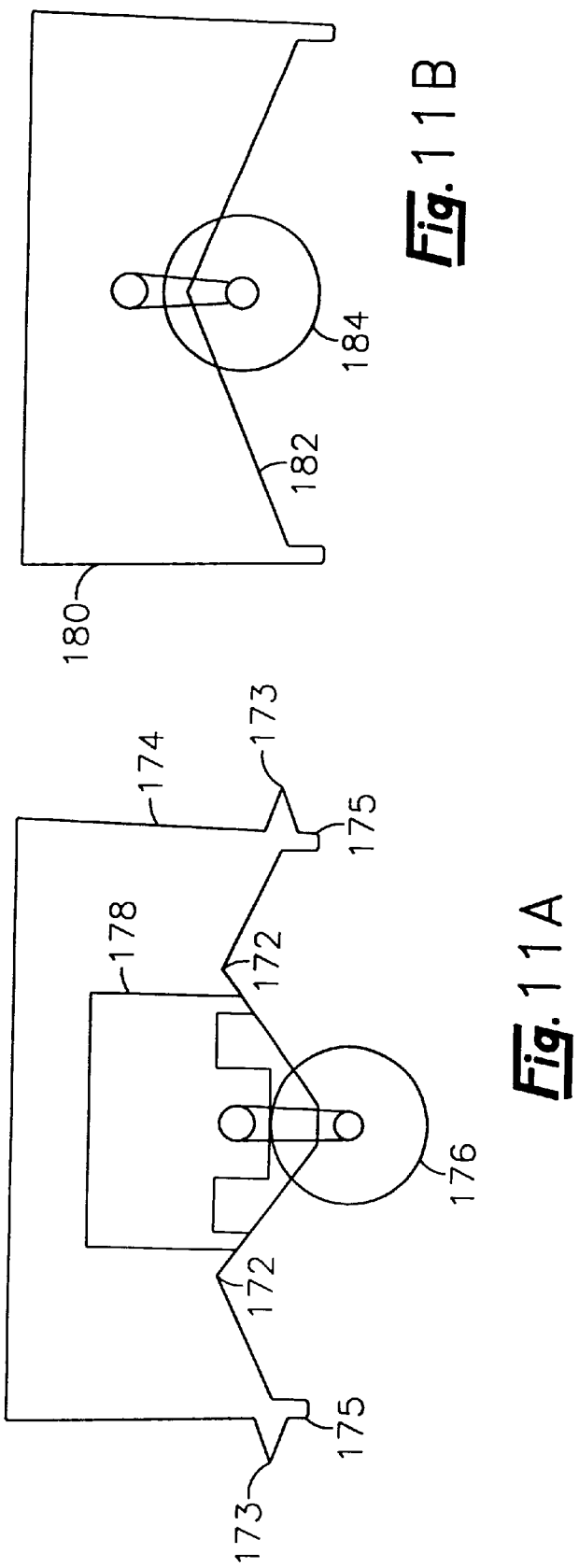
FIGS. 11(a) and (b) depict preferred transom configurations of the present invention.

Turning now to FIG. 11(b), an alternative transom and surface drive configuration of the present invention is shown. In FIG. 11(b), the transom 180 consists of a single inverted-V configuration 182. Placing the apex of the inverted-V 182 and the drive prop 184 in the center of the transom 180 directs air escaping from the transom 180 toward the drive prop 184. This escaping air flow lubricates the drive prop 184 and reduces the start up friction. Thus, embodiments where an initial reduced engine load is desirable and a high degree of ventilation is acceptable utilize the embodiment shown in FIG. 11(*b*).

Surface drives such as shown in FIGS. 9, 10 and 11(*a*) and (*b*) are the preferred means of propulsion in accordance with the present invention. Surface drives are preferred because their surface piercing propellers reduce underwater appendage drag in relation to submerged propeller drive systems. The reduced drag results in a higher overall fuel economy and top speed. The present invention further comprehends the use of horizontally and vertically adjustable surface drives as well as the use of enclosed tunnel surface drives. Adjustable surface drives increase steering control and improve maneuverability. In addition, the surface drives may be caged or enclosed for safety and aesthetic considerations. While a surface drive system is discussed and shown as the preferred method of propulsion, it is readily appreciated that the improved hull configuration of the present invention can be implemented with any of the wide variety of propulsion systems available such as conventional shaft drives, jet pumps, paddle wheels, outboards, stern drives, propeller fans, jet thrust, etc.

The present invention further comprehends the use of a variety of different props 176 in conjunction with a surface effect vessel. One such prop which has been determined to be particularly effective when used in conjunction with the surface effect vessel of the present invention is a variable pitch prop. Variable pitch props allow the thrust and resistance of the prop to be varied by adjusting the pitch of the prop's blades. Surface effect vessels tend to experience widely varying degrees of water resistance due to variations in the condition of the air cushion. Providing a manually or automatically adjustable variable pitch prop allows a user to rapidly compensate for varying conditions such as rough seas or venting air cushions which are particularly deleterious to surface effect vessels as compared to standard type vessels. In addition, a variable pitch can be used to provide a reversing function without the use of a gear box. Thus, a number of unappreciated advantages are obtained by utilizing a variable pitch prop in conjunction with a surface effect vessel. Therefore, the present invention has an embodiment wherein the prop 176 is a variable pitch prop.

Dual counter rotating props produce a decreased amount of steering torque on the vessel as compared to single props. Thus, the present invention has an embodiment wherein the prop 176 is a dual counter rotating prop.

Figure 12:
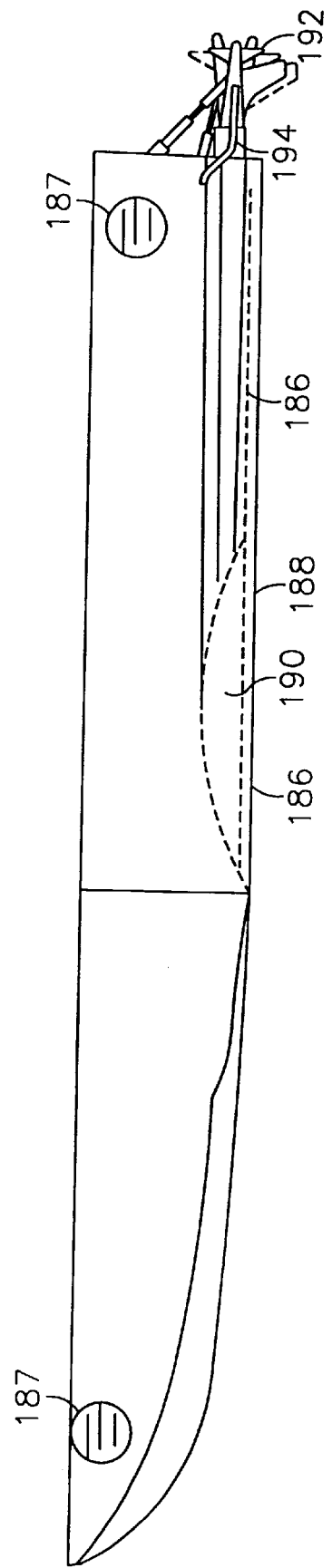
FIG. 12 is a side view of an embodiment of the invention having lubricating air vents.

FIG. 12 is a cutaway view of a surface effect vessel having lubricating air vents 186 arranged along the side hull 188 in accordance with a preferred embodiment of the present invention. The side hull 188 functions to contain the air cushion 190 under the surface effect vessel. However, it is been determined that allowing a predetermined amount of air to escape from the air cushion 190 through lubricating air vents 186 actually reduces the friction between the outside edge of the side hull 188 and the water by decreasing the surface area of the side hull 188 which is in contact with the water. The optimum size of the lubricating air vents 186 depends upon a number of factors such as the air pressure in the cushion 190, the number of lubricating air vents, the length of the side hull 188, the average running depth, etc. Furthermore, while the lubricating air vents 186 are depicted in FIG. 12 as holes 186 in the side hull 188, it is appreciated that the lubricating air vents could be implemented as a series of slots or stepped edges in the side hull 188 which allow a controlled amount of lubricating air flow to escape from the air cushion 190.

FIG. 12 also illustrates another use of lubricating air in conjunction with the present invention. As discussed above, introducing air around a prop 192 reduces the amount of surface area on the prop that is in contact with the water and, thus, decreases the rotational friction of the prop. Thus, one embodiment of the present invention controllably introduces air around the prop 192 through the use of an air introduction passage 194. The air introduction passage 194 is responsive to operator controls to provide air to the prop 192. Thus, the operator can introduce air during start up to decrease the time required for the vessel 192 to reach a desired speed. Because surface effect vessels already utilize some sort of air pressurization means, it is particularly cost effective to use air introduction means 194 in conjunction with a surface effect vessel.

One problem that is often encountered with large surface effect vessels is that they are hard to maneuver in tight spaces or at low speeds. Thus, the use of large, heavy, bow/stern side thrusters, tugs or docking hands may be required to dock a large surface effect vessel. FIG. 12 illustrates an embodiment of the present invention utilizing docking vents 187. Surface effect vessels typically have powered blowers for generating the air pressure necessary to maintain the air cushions. A portion of this pressurized air can be efficiently diverted toward docking vents 187 such as shown in FIG. 12. By ejecting pressurized air through the docking vents a vessel such as that shown in FIG. 12 is able to move short distances in a direction completely perpendicular to its normal direction of motion. This sideways motion is particularly beneficial for approaching a dock under crowded or cramped conditions. Furthermore, by adjustably controlling the amount of air vented from the different docking vents, the vessel can be made to turn in place. Thus, the provision of docking vents 187 economically improves the low speed maneuverability of large surface effect vessels.

Figure 13:
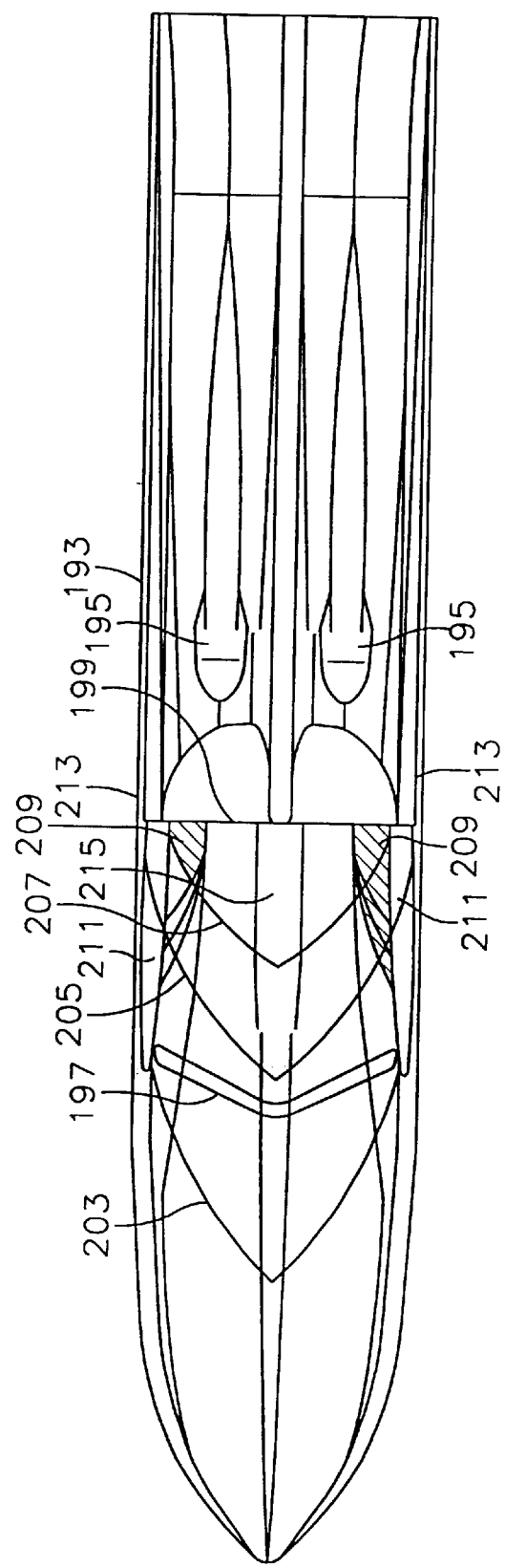
FIG. 13 is a bottom view of a mono hulled vessel having water redirecting portions.

FIG. 13 illustrates yet another use of lubricating air in accordance with the present invention. A bottom view of a vessel 193 having dual air cavities 195 and a forward seal lubricating air introduction vent 197 is shown. The air introduction vent 197 is a channel-like depression in the vessel's hull which runs from the center of hull to the sides of the hull. The air introduction vent 197 is located forward of the bow sealing region 199 of the air cavity 195. The air introduction vent 197 introduces a lubricating air flow forward of the air cavities 195 which reduces the friction of the hull against the water between the bow sealing region 199 and the air introduction vent 197. The size and depth of the air introduction vent 197 is optimally selected such that the amount of air introduced under the hull is large enough to reduce the friction between the hull and the water's surface yet small enough that it does not induce venting of air from the air cavities 195 nor interfere with the functioning of the water redirecting portions 211.

The functioning of the vessel 193 can be best understood with reference to the foot print lines 203, 205 and 207 which represent the portions of the bow of the vessel 193 in contact with the water's surface at different speeds. For example, when the vessel 193 is resting or moving slowly in the water, footprint line 203 represents the water air boundary. As the vessel 193 gains speed, the amount of surface area of the hull in contact with the water's surface decreases to the amount represented by foot print line 205 and the edges of the air introduction vent 197 are exposed to the air. Due to the reduced pressure created in the air introduction vent 197 by the water rushing over its surface, air is sucked into the air introduction vent 197 at its edges and released under the hull. Thus, the amount of friction between the vessel 193 and the water's surface is reduced and the efficiency of the vessel 193 is correspondingly increased. While a passive air introduction vent 197 is shown, it is readily appreciated that an active air introduction vent 195 that utilizes pressurized gas from a source such as the blowers of the surface effect vessel may be used such that the amount of air introduced can be manually controlled by an operator of the vessel 193.

FIG. 13 is also useful for illustrating the benefits of water redirecting portions 211 in conjunction with a single hulled vessel 193 having dual air cavities 195. As the speed of the vessel increases to the point that the foot print of the vessel 193 is represented by line 207, blow through areas 209 begin to be created between the side hulls 213 and the apex of the v-shaped hull 215. The water redirecting portions 211 create a directed water flow which collides with a water flow created by the apex 215 of the v-shaped hull acting on the water's surface. The collision of these water flows creates a water mass in the blow through areas 209 which prevents air from venting from the air cavity 195 through the blow through areas 209. Thus, the efficiency of the vessel 193 is improved.

Figure 14:
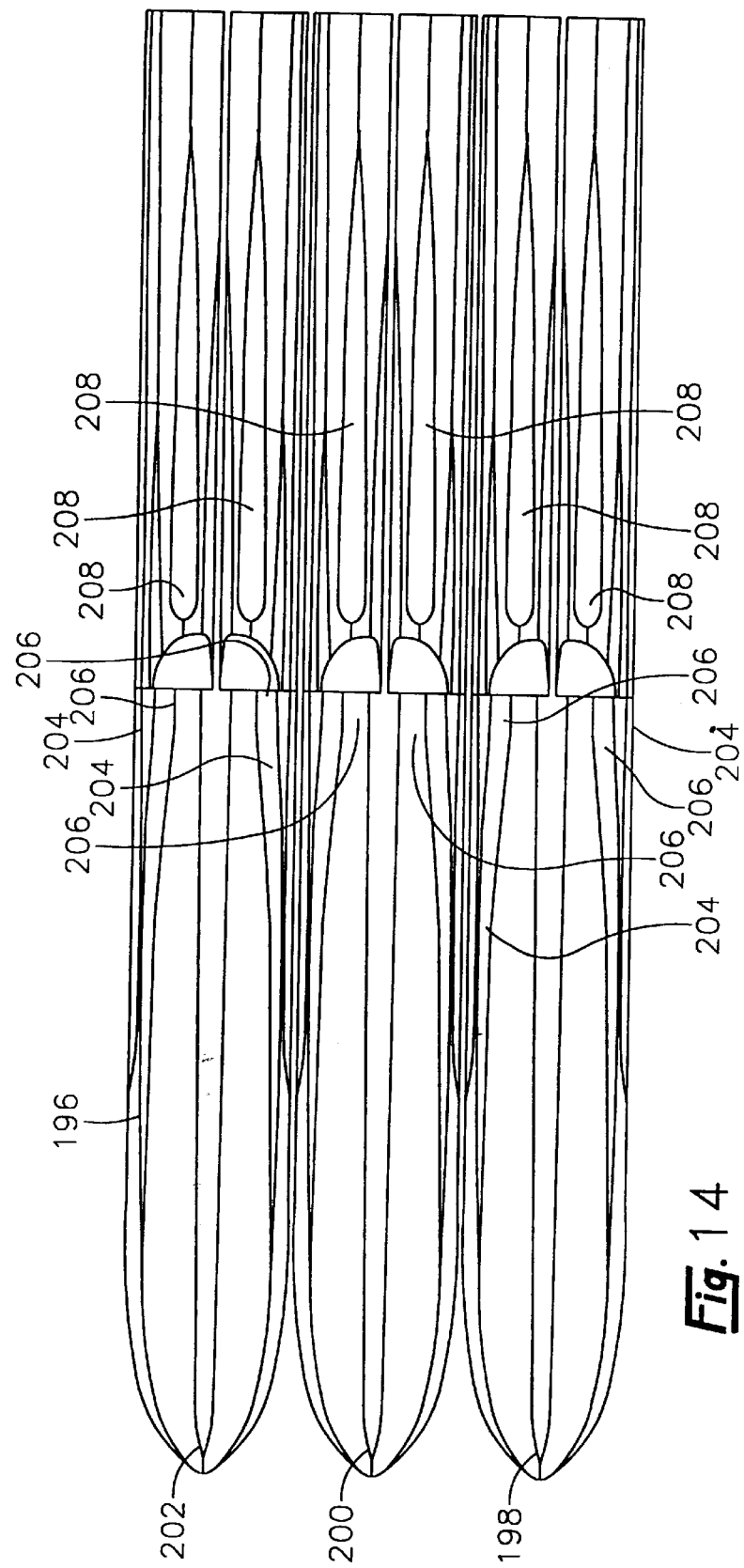
FIG. 14 is a bottom view of an embodiment having three adjacent hull structures.

One embodiment of the present invention which is particularly adapted for a large wide vessel such as a ferry is shown in FIG. 14. In such an embodiment, the surface effect vessel consist of three adjacent v-shaped hull sections 198, 200 and 202 six corresponding air cushions 208 located aft of the v-shaped hull sections. The v-shaped hull sections 198, 200 and 202 serve to cut through the waves and improve the ride quality of the vessel as previously discussed. Water redirecting portions 204 are shaped to direct water flows into the blow through areas 206 which form as the v-shaped hull sections act upon the water to lift the vessel with respect to the water's surface. Thus, the water redirecting portions 204 prevent the air cushions 208 corresponding to the v-shaped hull sections 198, 200 and 202 from venting pressurized gas through the blow through areas 206. Power and fuel must be expended to create the pressurized gas in the air cushions 208. Thus, by preventing the venting of pressurized gas, the above discussed bow configuration improves the fuel economy of the vessel.

Constructing the vessel 196 with multiple v-shaped hulls 198, 200 and 202 provides the vessel with the benefits of the invention discussed above. In addition, the provision of multiple v-shaped hulls also improves the shallow water performance of the vessel 196 by decreasing the draft of the vessel. In a large vessel, a single v-shaped hull would either extend so deep into the water that the vessel 196 could not be used in shallow water or have such a low dead rise angle that the vessel 196 would tend to ride up on the wave peaks and vent air from the air cushions. Furthermore, the provision of multiple v-shaped hulls decreases the size of the wake produced by the vessel 196. A small wake can be particularly beneficial for boats traveling in high traffic areas having wake restrictions. An example of such a boat would be a ferry operating in a congested harbor. A reduced wake may also be beneficial for boats traveling through environmentally managed areas where the shoreline erosion caused by large wakes is undesirable or prohibited altogether.

As previously discussed, the present invention comprehends an embodiment having bow 210 and 212 and aft 214 and 216 air compartments as shown in FIG. 15. The bow air compartments 210 and 212 are separated from the aft air compartments 214 and 216 by a separation portion 218 similar to the separation portion 116 shown in FIG. 8(*a*). Likewise, a dividing portion 220 separates the starboard bow air compartment 210 from the port air compartment 212 and the starboard aft air compartment 214 from the port aft air compartment 216. Air inputs are provided in each of the air compartments 210, 212, 214 and 216. The separation portion 218 and the dividing portion 220 function together such that the air pressure in the air compartments 210, 212, 214 and 216 are independently adjustable. The provision of an adjustable air pressure in the bow and aft air compartments, as well as the port and starboard air compartments, provides a number of benefits as discussed with regard to the previous embodiments. In addition, when one of the air compartments 210, 212, 214 and 216 vents, the separation portion 218 and the dividing portion 220 act to prevent the remaining air compartments from also venting. Thus, while an embodiment as shown in FIG. 15 increases the complexity of the hull design, many advantages are obtained by the provision of longitudinally divided bow and aft air compartments.

In accordance with embodiments of the present invention, there are a variety of different principals or effects that are incorporated into a vessel's hull to improve its range, speed, efficiency and performance. One such principal or effect is the surface effect discussed above wherein a layer of air is utilized to reduce the friction between the vessel's hull and the water's surface. Another such effect that can be utilized to improve the performance of a vessel is the lifting body effect. An exemplary illustration of a hull configuration in accordance with an embodiment of the present invention is depicted in FIG. 16. The hull 228 shown in FIG. 16 consists of a superstructure 230 and a lower hull structure 232. The hull 228 is preferably constructed of an advanced high strength, low weight material that resists damage such as directional fiberglass, carbon fibers or Kevlar. The superstructure 230 is aerodynamically designed such that the movement of the super structure 230 through the air creates an air flow 234 that establishes a low pressure zone 236 in the area above the superstructure 230. The lower hull structure 232 is preferably designed to have an inner wet deck 231 such that a space is provided beneath the inner wet deck 231 for air to flow between at least a portion of the inner wet deck 231 and the water's surface 238. One example of such a lower hull structure 232 would be the catamaran structure previously discussed. The low pressure zone 236 is created due to the fact that the air must flow up and over the superstructure 230. Thus, the air 234 flowing over the superstructure 230 is moving faster than the air 240 flowing beneath the inner wet deck 231. This difference in air velocity creates the low pressure zone 236 above the superstructure 230. This low pressure zone 236 creates a lifting body effect that raises the hull 228 with respect to the water's surface. Thus, the lifting body configuration of the superstructure 230 reduces the friction between the water's surface and the hull 228.

FIG. 16(*a*) also depicts another effect that can be utilized with selected embodiments of the present invention. If the lower hull structure 232 is constructed in the catamaran fashion discussed above such that it consists of two hull bodies connected by the inner wet deck 231 that is supported by the two hull bodies over the water's surface, a tunnel is created beneath the inner wet deck 231 that allows air to flow between the lower surface 244 of the inner wet deck 231 and the water's surface 238. By placing a tunnel compression flap 242 inside of this tunnel created below the lower surface 244 of the inner wet deck 231, the air flow 250 through the tunnel can be restricted. Dotted lines are used in FIG. 16(*a*) to indicate that tunnel compression flap 242, lower surface 244 and air flow 250 are enclosed by the lower hull structure 232. Restricting the air flow 250 with the tunnel compression flap 242, induces a tunnel compression effect whereby the pressure of the air in the tunnel is increased. This increased air pressure works in conjunction with the low air pressure zone 246 to create additional lift for the hull 228. Thus, when the air flow 250 is restricted with the tunnel compression flap 242, the friction between the hull 228 and the water's surface 238 is decreased. Preferably, the tunnel compression flap 242 is adjustable such that the vessel can be operated in a mode wherein the tunnel compression flap 242 is placed in a non-restricting position by an operator such that air flow through the tunnel is not restricted. This allows the tunnel compression effect to be controlled such that at high speeds the amount of lift created is not sufficient to lift the entire hull structure 228 from the water's surface 238 for an undesirably large amount of time and, thereby, result in loss of control of the vessel. Nevertheless, it will be readily appreciated by those skilled in the art that, during normal operation, a high speed vessel, may occasionally bounce into the air due to wave action without resulting in a loss of control.

While the tunnel compression flap configuration 242 is preferred, it is appreciated that, in selected embodiments of the present invention, the lower surface 244 of the inner wet deck 231 may be configured such that a predetermined amount of additional lift is generated at a predetermined speeds. This type of construction is less complicated to build and operate than the tunnel compression flap 242. However, a dedicated tunnel shape does not allow for the flexibility and control of the tunnel compression flap 242.

Due to the substantial amounts of lift that may be created through the utilization of the lifting body effect and the tunnel compression effect, a preferred embodiment of the present invention utilizes forward 246 and rear 248 control surfaces. These control surfaces 246 and 248 essentially function as wings or stabilizers that can be controllably or automatically operated to prevent the vessel from becoming airborne at high speeds. These control surfaces 246 and 248 can also be operated to maintain a desired operating angle by selectively providing more or less lift to the forward 246 or rear control surface 248. In addition, if desired, the control surfaces 246 and 248 may be wing-shaped such that they can also be operated to provide additional lift for the hull 228 and, thereby, reduce the friction between the lower hull structure 232 and the water's surface 238. Furthermore, the control surfaces 246 and 248 may be extended to the sides of the vessel to utilize a wing and ground effect.

Figure 16A:
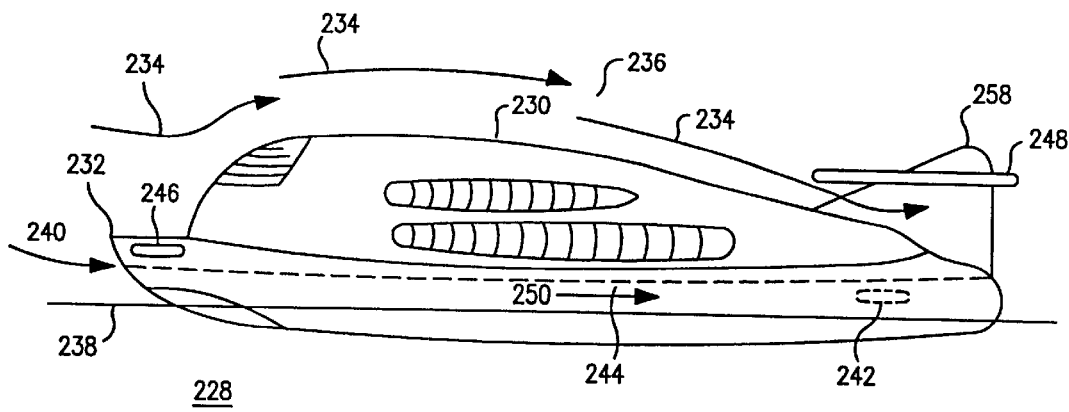
FIGS. 16(a) and (b) respectively depict a side-view and an overhead view of an embodiment of the present invention utilizing a lifting body effect.
Figure 16B:
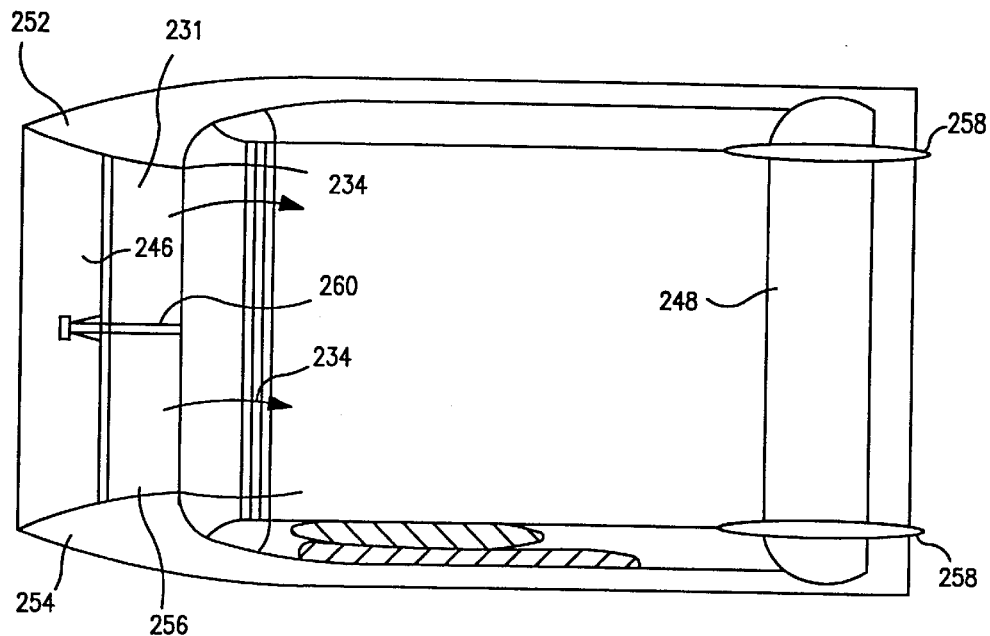

FIG. 16(b) is an overhead view of the vessel of FIG. 16(a). The forward control surface 246 is mounted between the two catamaran-like hull portions 252 and 254 that are joined by a connecting deck structure 256 in a canard type configuration. A control bar 260 is provided to adjust the angle of the forward control surface 246. The rear control surface 248 is mounted between two vertical fin-shaped stabilizers 258. In selected embodiments, these fin-shaped 258 stabilizers could be operable to provide directional steering at high speeds. However, in the embodiment shown, they are fixed structures that interact with the air flow 234 to keep the vessel's hull 228 oriented in a forward facing direction.

Figure 17A:
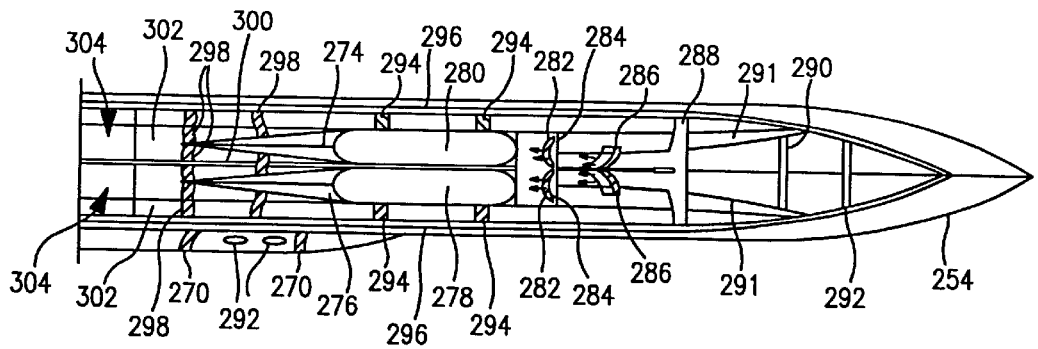
FIGS. 17(a) and (b) respectively depict a side-view and an overhead view of an embodiment of the present invention utilizing anti-slamming water release vents and boost ports.

Referring now to FIG. 17(a), a preferred construction for the bottom of the lower hull structure 232 of FIG. 16(a) is shown. More particularly, FIG. 17(a) depicts the underside of the port side catamaran-like portion 254 shown in FIG. 16(b). The catamaran-like portions 252 and 254 are asymmetric in that each one has an exterior portion 264 that faces the exterior of the vessel and an interior portion 266 that faces the air tunnel created between the catamaran-like portions 252 and 254 wherein the exterior 264 and interior 266 portions have different configurations. One example of this asymmetry is the non-trip side projection 268 shown on the exterior of the port side catamaran-like portion 254. The starboard catamaran-like portion 252 would be a mirror image of the port side catamaran-like portion 254 with respect to the non-trip projection 268.

The non-trip projection 268 of the embodiment shown performs a number of functions. Most importantly, the port side non-trip projection 268 prevents the port side 254 of the vessel from cutting into the water's surface during a hard turn and causing the vessel's starboard 252 side to rise out of the water. In severe situations, the starboard side 252 could rise so far out of the water as to cause the vessel to roll over. However, when the port side 254 of the vessel begins to drop into the water during a hard turn, the non-trip projection 268 comes into contact with the water's surface and provides addition lift to the port side 254 of the vessel. This additional lift encourages the vessel to maintain an upright orientation and, thus, improves the safety and handling of the vessel. Preferably, the non-trip projection 268 has slotted lubricating air vents 270 that provide a lubricating air flow along the under side of the non-trip projection 268 such that friction between the bottom surface of the non-trip projection 268 and the water's surface is minimized. The slots insure a uniform distribution of the lubricating air flow. In addition, exhaust ports 272 may be provided on the underside of the non-trip projection 268 such that the exhaust ports 272 are partially submerged during operation. This minimizes the noise produced by the exhaust ports 272. In addition, the exhaust from the exhaust ports 272 contributes to the lubricating air flow provided by the slotted lubricating air vents 270.

The hull of FIG. 17(a) has two gas cavities 274 and 276 that receive pressurized gas, such as air, from two blower ducts 278 and 280. The gas cavities 274 and 276 create a layer of gas between the hull 254 and the water's surface, thereby, reducing the friction between the water's surface and the hull 254. A pair of boost ports 282 are provided aft of a bow side edge 284 of the gas cavities 274 and 276. These boost ports 282 provide enhanced performance by controlling the direction of the gas flow of the pressurized gas in the gas cavities 274 and 276. In particular, the boost ports 282 are configured to prevent gas in the gas cavities 274 and 276 from flowing toward the bow of the vessel when the bow of the vessel is lifted from the water's surface. At high speeds, the gas in the cavities 274 and 276 is partially prevented from escaping from the bow side edge of the gas cavities by the force of the outside air ramming into the bow of the vessel as the vessel moves through the air. However, this natural ram air effect is much less pronounced at low speeds and of limited effectiveness. The boost ports 282 introduce relatively high velocity gas into the gas cavities 274 and 276 with a bow to aft flow direction. Preferably, the velocity of the gas delivered from the boost ports 282 is approximately 1.2 times the velocity of the gas delivered from the blower ducts 278 and 280. However, it will be appreciated by those skilled in the art, in light of the present disclosure, that any significant increase in the velocity or pressure of the gas delivered from the boost ports 282 with regard to the gas delivered from the blower ducts 278 and 280 will improve the performance of a surface effect vessel in the manners discussed in more detail below. The relatively high velocity, high pressure gas flow improves the performance of the vessel in a number of respects. The rush of high velocity gas from the boost ports 282 toward the aft of the vessel through the gas cavities 274 and 276 impedes the flow of gas through the gas cavities 274 and 276 toward the bow of the vessel. In addition, the high velocity gas from the boost ports 282 re-pressurizes the gas cavities 274 and 276 after a venting has occurred. Thus, the boost ports 282 dramatically reduce the lurching that typically occurs when a surface effect vessel vents gas from its supporting gas cushions. The boost ports 282 are also referred to as fairing inlet ports.

A second pair of boost ports 286 is provided on the bow side of the bow side edge of the gas cavities 274 and 276. This pair of boost ports 286 helps maintain the pressure in the gas cavities 274 and 276 by directing a high velocity gas flow toward the bow side edge of the gas cavities 274 and 276. This aftward flow of gas impedes the escape of pressurized gas the gas cavities 274 and 276. Furthermore, when the bow side edges 284 of the gas cavities 274 and 276 temporarily lose contact with the surface of the water due to wave action or maneuvering of the vessel, the gas flow from the boost ports 286 induces a venturi effect at the water/gas boundary 284 at the front of the gas cavities 274 and 276. In accordance with this venturi effect, swirling water at the water/gas boundary 284 sucks gas into the gas cavities 274 and 276 at their bow side edges. This gas helps to rapidly re-pressurize the gas cavities 274 and 276 once gas pressure has been lost due to venting of the gas cavities 274 and 276, thereby, minimizing lurching of the vessel. In addition, the flow of gas from the boost ports 286 along the underside of the hull provides a lubricating air flow that decreases the amount of friction between the hull and the water's surface. In that regard, a surface effect vessel that utilizes boost ports 286 is a significant improvement upon the prior art.

FIG. 17(*a*) further illustrates a combined air lubricator/anti-slamming water release vent 288 that improves the performance of the vessel in at least two respects. The combined air lubricator/anti-slamming water release vent 288 is a channel that runs across the hull 254 in a direction that is approximately perpendicular to the hull's 254 direction of movement through the water. The vent 288 is preferably placed slightly aft of the expected water line on the bow of the vessel when the vessel is running at an predetermined cruising speed such that only the edges of the vent 288 are out of the water. The force of the water rushing over the submerged center of the vent 288 when the vessel is cruising sucks a lubricating air flow under the hull of the vessel from the exposed edges of the vent 288. As previously stated, this lubricating air flow improves the performance of the vessel by decreasing the friction between the hull and the water's surface.

The combined air lubricator/anti-slamming water release vent 288 further improves the performance of the vessel when operating in relatively rough seas by providing an escape path for water trapped under the hull. For example, when a boat hull penetrates a heavy wave or generates a heavy impact against the water's surface, the boat is jarred by the impact of the boat's hull coming into contact with the water. This is especially true for vessels having a relatively unsloped or flat hull bottom with a low dead rise angle. The combined air lubricator/anti-slamming water release vent 288 minimizes this impacting effect by allowing water trapped under the hull to vent to the sides of the vessel. Thus, the combined air lubricator/anti-slamming water release vent 288 allows a vessel to enjoy the advantages of a hull having a low dead rise angle without sacrificing performance in rough seas.

Flow separators 290 and 292 are provided on the bow pf the vessel shown in FIG. 17(*a*). These separators 290 and 292 direct water away from the bow instead of allowing it to flow along the sides of the hull 254. By minimizing the area of the hull 254 in contact with the water, the flow separators 290 and 292 reduce the friction between the water's surface and the hull, thereby, improving the performance of the vessel. Through hole lubricators 294 also reduce friction between the hull and the water's surface by allowing a small portion of the pressurized gas from the gas cavities 274 and 276 to flow along channels on the hull's underside to holes in the side hulls 296 that are used to prevent gas from escaping from the gas cavities 274 and 276. This released gas flows along the outside edge of the side hulls 296 when the vessel is in motion, thereby, reducing the surface area of the side hulls 296 that is in contact with the water's surface. Farther toward the aft of the vessel, slotted air lubricators 298 are provided that utilize pressurized gas from the gas cavities 274 and 276 to provide lubricating air flows to the separation portion 300 used to divide the gas cavities 274 and 276, the aft portions 302 of the hull 254 that are in contact with the water, and the side hulls 296 use to seal the gas cavities 274 and 276. Moveable bottom surfaces 304 positioned in the aft of the hull 254 allow an operator of the vessel to control the aft seal of the gas cavities 274 and 276 while also providing a trim function that can be utilized to maintain a desired hull orientation with respect to the water's surface.

Figure 17B:
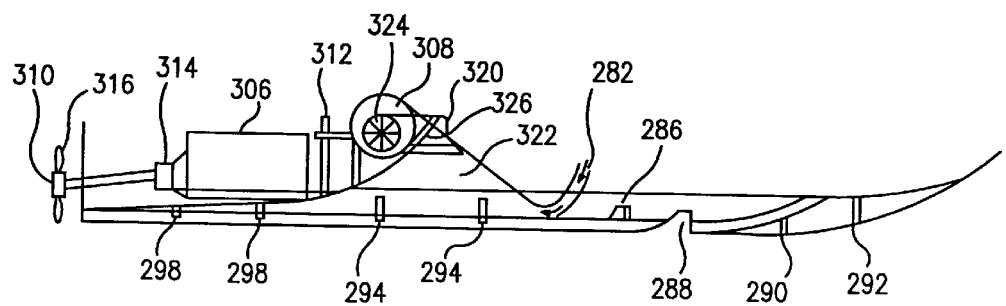

FIG. 17(*b*) shows a preferred engine 306 and blower 308 arrangement for use with the hull configuration of FIG. 17(*a*). In the embodiment shown, the same engine 306 is used to drive the blower 308 and the surface drive prop 310. The blower 308 has an optimal operating range in revolutions per minute (rpm) in which its performance is maximized. While the blower 308 is ideally operated at a relatively constant rpm to provide a fairly constant air pressure, the surface drive prop's 310 desired operating speed in rpm varies dramatically with the speed of the vessel. Therefore, provisions must be made for coupling the engine 306 to the blower 308 and prop 310 such that the desired rpm for each device is achieved. A number of different means for accomplishing this coupling are shown in FIG. 17(*b*). A constant speed drive system 312 can be used to couple the drive shaft of the engine 306 to the blower 308 such that the blower 308 has non-overloading horsepower characteristics. This constant speed drive system 312 utilizes a transmission to drive the blower 308 such that the blower 308 is driven at a relatively constant rate in rpm regardless of the engine's 306 speed in rpm. Both mechanical and hydraulic means may be incorporated into the drive system 312 to insure that the blower 308 maintains a relatively constant speed. Alternatively, a variable speed transmission 314 may be provided between the engine 306 and the prop 310. The variable speed transmission 314 allows the engine 306 and the blower 308 to be run at a relatively constant rate while the speed of the vessel is controlled by operating the transmission 314. Further control of the speed of the vessel is provided by the provision of a variable pitch prop 310. By adjusting the pitch of the blades 316 of the variable pitch prop 310, a range of different thrusts can be obtained while the prop 310 is rotating at a relatively constant rate in much the same way as the pitch of the propellers of an airplane are manipulated to control the thrust provided by the propellers. Thus, the prop 310 may be rotating at a relatively high rpm without providing any thrust to the vessel at all if desired. An additional amount of control is obtained by providing an inlet damper 324 and an outlet damper 326 for the blower 308 such that the air pressure or air volume generated by the blower 308 can be kept relatively constant while the rpm of the blower varies. Alternatively, an axial fan having in-flight adjustable pitch blades may be used as a blower 308. Both in-flight and inter-vane adjustable blades reduce the need for a constant operating speed. In larger vessels, different engines may be used to power the blower 308 and the prop 310 such that the problems associated with coupling the same engine to both the blower 308 and the prop 310 can be entirely avoided. However, the more demanding space requirements of relatively smaller vessels make the single engine configuration of FIG. 17(b) very desirable in certain situations.

FIG. 17(b) also illustrates a preferred blower placement that provides additional thrust to the vessel while decreasing the amount of energy required to power the blower. In particular, the blower 308 is positioned in the vessel such that its air inlet 320 is pointing toward the bow of the vessel. Thus, when the blower 308 is functioning, its pressure differential can add forward thrust that helps propel the vessel through the water. In addition, as the vessel picks up speed, a ram air effect is induced whereby air is forced into the inlet 320 of the blower 308 by the movement of the vessel. While the thrust provided by the blower 308 is typically not enough to power the vessel, the blower configuration of FIG. 17(b) does increase the operating efficiency of the vessel. It will be further appreciated that the vessel of FIG. 17(a) could use an air thrust system for propulsion if desired.

Figure 18A:
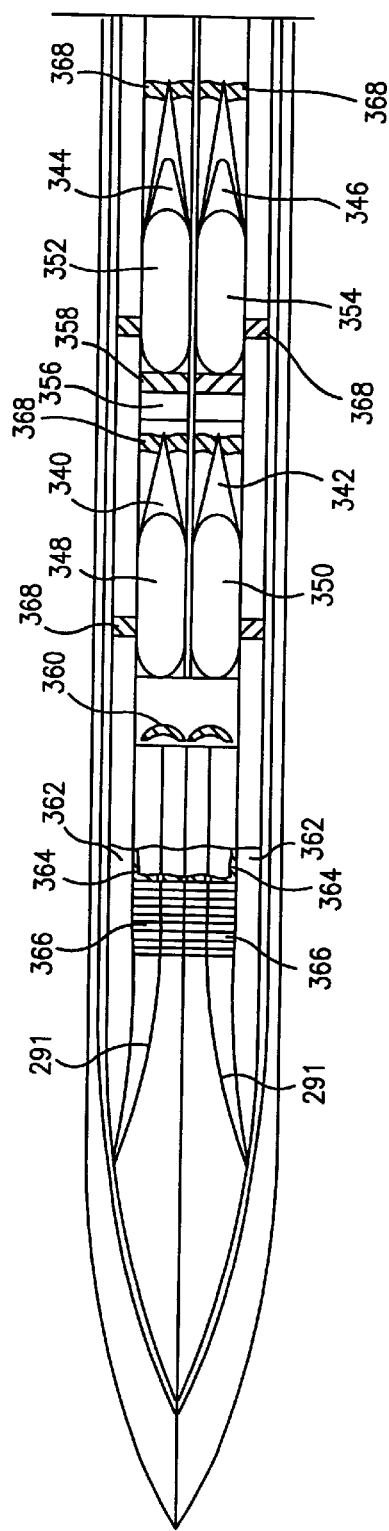
FIGS. 18(a) and (b) respectively depict a side-view and an overhead view of an embodiment of the present invention having multiple air cavities that utilizes a ram air and venturi effect.

Referring now to FIGS. 18(a) and (b), an embodiment of a hull configuration utilizing the above discussed improvements and having multiple lateral and longitudinal air cavities is shown. In the embodiment, four air cavities 340, 342, 344 and 346 are provided. The two bow side air cavities 340 and 342 are supplied with pressurized air from two bow side blower ducts 348 and 350. Similarly, the two aft side air cavities 344 and 346 are provided with pressurized air from two aft side blower ducts 352 and 354. A separation portion 356 separates the bow side air cavities 340 and 342 from the aft side air cavities 344 and 346. A first pair of boost ports 358 are provided on the aft side edge of the separation portion 356. A second pair of boost ports 360 are provided on the bow side edge of the air cavities 340 and 342. These boost ports 358 and 360 help establish an aftward air flow that substantially prevents air from escaping from the bow sides of the air cavities 340, 342, 344 and 346. Water release vents 362 are provided forward of the bow side air cavities 340 and 342 to diminishing the jarring caused by the vessel impacting the water's surface due to heavy wave impacts and bouncing of the vessel as previously discussed. Valve doors 364 are provided for the water release vents 362 such that the valve doors 364 are biased to remain closed until forced open by a heavy wave impact. Sealing wedges 366 are provided in the blow through areas. The sealing wedges 366 are biased toward the water's surface with enough force to keep their bottom side edges in contact with the water's surface. Thus, these sealing wedges 366 prevent air from escaping from the bow side edges of the bow side air cavities 340 and 342. Slotted air lubricators 368 are provided from each of the air cavities 340, 342, 344, and 346 to provide a lubricating air flow to the sealing side hulls 370. The slots in the air lubricators 368 insure an even distribution of the lubricating air flow.

Figure 18B:
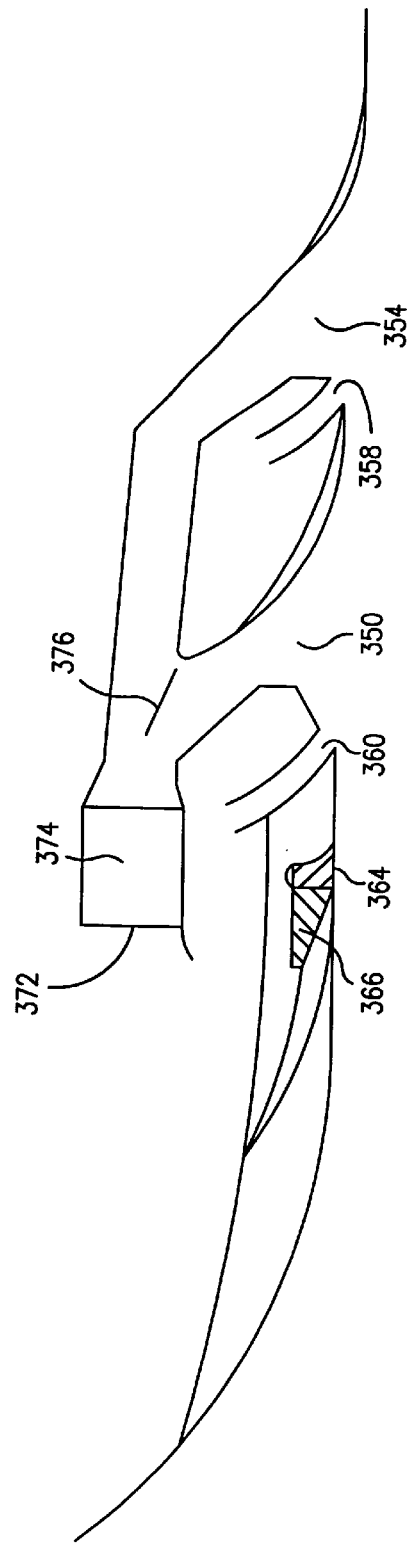

In FIG. 18(b), a cutaway side view of the hull configuration of FIG. 18(a) is shown. The air cavities 350 and 354 are supplied with air from a blower 374. The blower 374 is oriented with its air inlet 372 facing forward to take advantage of the air ram effect discussed above by establishing an axial air flow. A flow directing baffle 376 is provided to allow the relative amount of air being provided to the bow air cavity 350 with respect to the aft air cavity 354 to be controllably adjusted. The boost ports 358 and 360 are configured to provide a high pressure sealing air flow at the bow side edges of the air cavities 350 and 354. A side view of the sealing wedges 366 and water vent doors 364 is also shown.

It should be noted that, as shown in the views of FIGS. 17(a) and (b) and 18(a) and (b), in selected embodiments, the water redirecting projections 291 are extended farther toward the bow to provide a greater distance for the projections 291 to capture and direct water toward the blow through areas. This especially beneficial in higher speed applications because, as speed increases, the water forward of the air compartments needs more distance to become smooth and effective as a plug in the blow through areas.

Figure 19A:
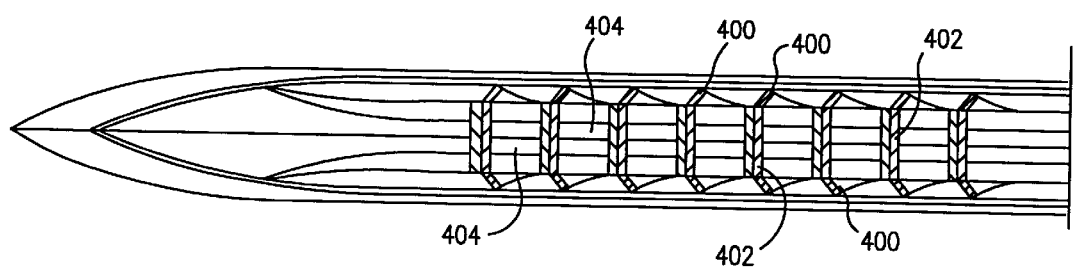
FIGS. 19(a) and (b) respectively depict a side-view and an overhead view of an embodiment of the present invention utilizing multiple air cavities and boost ports.
Figure 19B:
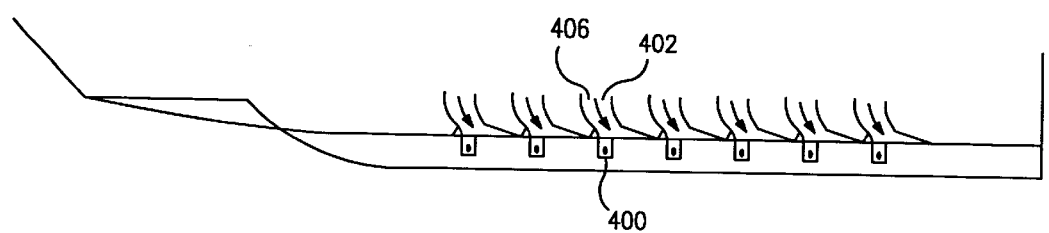
Figure 20A:
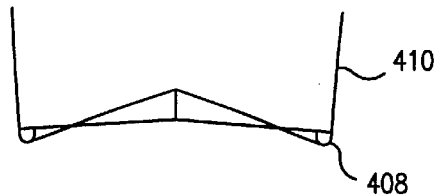
FIGS. 20(a–d) depict exemplary hull configurations for use with selected embodiments of the present invention.
Figure 20B:
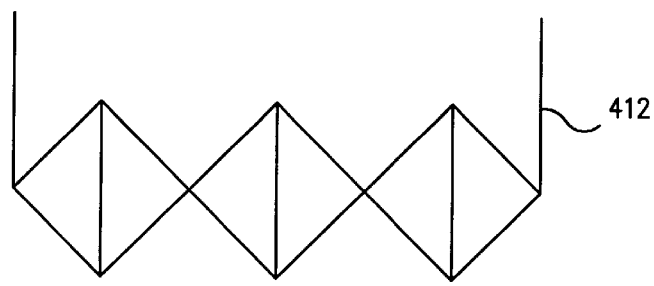
Figure 20C:
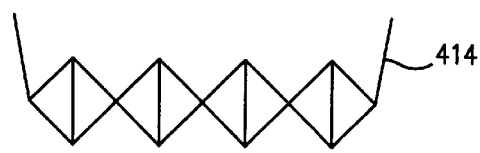
Figure 20D:
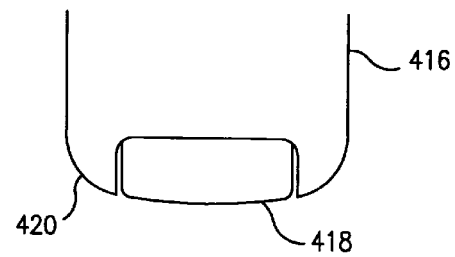
Figure 2L:
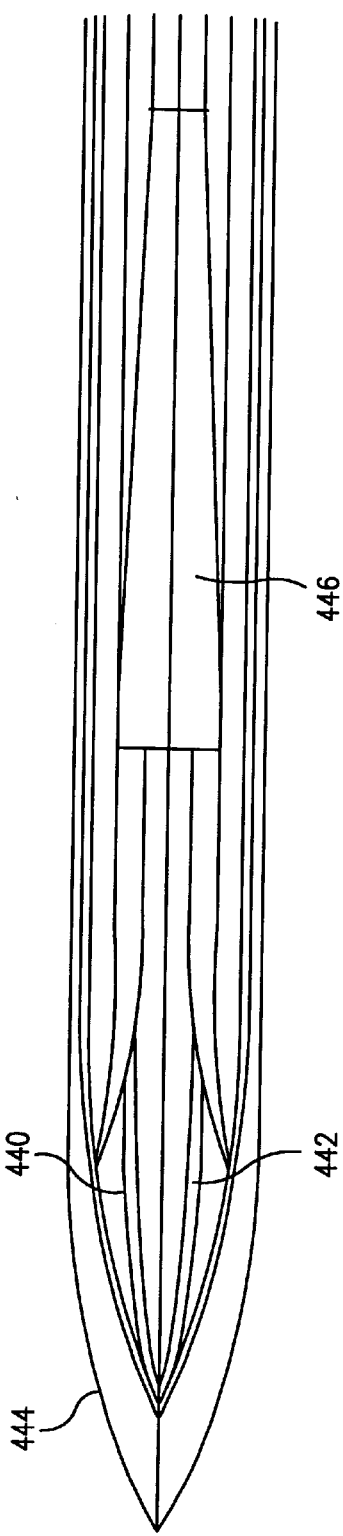
Figure 2L:
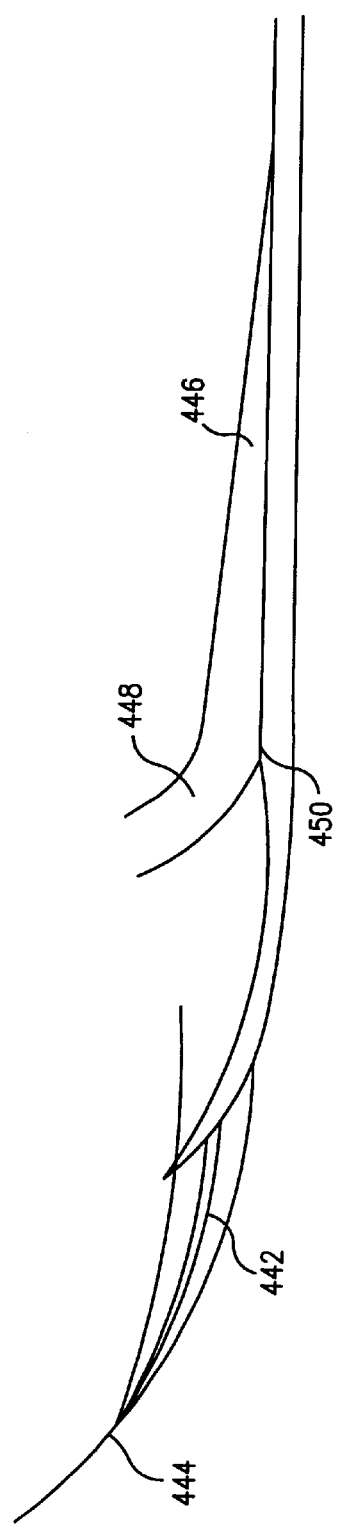

Although they have been discussed with respect to particular hull configurations, many of the above improvements can be utilized with a variety hull types. For example, FIGS. 19(a) and (b) depict the use of side air lubricators 400, boost ports 402 and flow directing baffles 406 on a vessel having multiple air cavities 404. Such a configuration is particularly use for a large, long vessel such as used for military applications. FIGS. 20(a–d) further illustrate some of the different hull configurations contemplated for use the improvements of the present invention. FIG. 20(a) depicts an inverted-V shaped hull 410 having sealing side hulls 408 that is sometimes referred to as a Hickman Sea Sled. Because of the difficulty in preventing air from a supporting air cushion form escaping from such a configuration, many of the methods of sealing the air cushion previously discussed are useful with the hull configuration 410 of FIG. 20(a). The present invention may also be scaled for a tri-hulled configuration 412 similar to a Boston Whaler shown in FIG. 20(b), or any other multi-hulled configuration such as the four-hulled configuration 414 shown in FIG. 20(c). The features discussed above with respect to single V-hull configurations are simply repeated for each hull of such a multi-hulled vessel 412 and 414. Finally, a tunneled hull 416 having a movable inner skirt 418 such as shown in FIG. 20(d) is well suited to utilize boost ports to increase the sealing effectiveness of the moving inner skirt 418 and to utilize air lubricators to decrease the drag of the sealing side hulls 420. Thus, while particular hull configurations are shown and discussed, it is appreciated that they are exemplary only and the present invention has wide applicability.

Referring now to FIG. 21 (a), an embodiment of the present invention having forward lower spray rails 440 and 442 is shown. Hull 444 has a relatively large single air cavity 446. The spray rails 440 and 442 are positioned on the hull 444 forward of the air cavity 446 such that they are slightly above the running water line. Without the spray rails 440 and 442, water will tend to run up the sides of the vessel when the vessel crosses through a wave. This wave action increases the wetted area of the hull 444 that is in contact with the water and, thus, increases the drag of the hull 444 in the water. The increase in drag causes an undesirable decrease in speed. The spray rails 440 and 442 deflect the wave away from the hull 444 when passing through normal wave heights thereby preventing wave migration up the hull 444. Thus, the spray rails 440 and 442 improve the performance of a vessel constructed in accordance with the present invention when operating in choppy seas.

FIG. 21(b) shows a side view of the spray rails 440 and 442 on the hull 444. FIG. 21(b) also shows an arrangement for introducing air into the air cavity 446. The air is introduced through a duct 448 such that the air is directed toward the aft of the hull 444. Furthermore, the inlet 450 of the duct 448 is configured to have a relatively sharp edge such that there is not a perpendicular separation step at the inlet 450. This arrangement allows the inlet 450 to slide across the water's surface with creating turbulence or forcing water into the duct 448. In addition, the aftward air flow created by the air entering the air cavity 446 impedes air from escaping from the bow side edge of the air cavity 446.

In view of the above explanation of the particular features of the present invention, it will be readily appreciated by one skilled in the art that the present invention can be usefully employed in a wide variety of embodiments. While certain embodiments have been disclosed and discussed above, the embodiments are intended to be exemplary only and not limiting of the present invention. The appropriate scope of the invention is defined by the claims set forth below.

I claim:

1. A vessel for traveling over a surface of a water, said vessel including a hull for supporting said vessel upon said water's surface wherein said hull has at least one air cavity that is adapted to receive pressurized air from a blower, said hull further comprising:
    a first air introduction means for introducing said pressurized air from said blower into said at least one air cavity;
    sealing side hull portions adapted to reduce air loss from said at least one air cavity wherein said sealing side hull portions extend substantially parallel to said vessel's direction of movement along said hull;
    air lubricators for providing a lubricating air flow along said sealing side hull portions and within said hull; and
    a second air introduction means for providing a sealing airflow of pressurized air to an edge of said at least one air cavity wherein said second air introduction means provides air at a higher velocity than said first air introduction means.

2. The vessel of claim 1 further wherein said second air introduction means further comprise boost ports that introduce air into said at least one air cavity near a bow side edge of said at least one air cavity such that an air flow is established wherein said air flows toward an aft portion of said vessel.

3. The vessel of claim 2 wherein said boost ports introduce air having a pressure at least 1.2 times as high as said first air introduction means.

4. The vessel of claim 1 wherein said vessel further comprises movable sealing wedges for preventing air from escaping from said air cavity wherein said sealing wedges are biased to substantially maintain contact with said water's surface.

5. The vessel of claim 1 wherein said air cavity is laterally divided into at least two air cavities by a dividing portion.

6. The vessel of claim 1 wherein said air cavity is longitudinally divided into at least two air cavities by a separation portion.

7. The vessel of claim 1 wherein said hull is configured such that when said hull moves through air, air moving over an upper portion of said hull creates a low pressure zone above said upper portion of said hull such that said hull generates lift as said hull moves through the air.

8. The vessel of claim 1 wherein said blower has an air inlet and said air inlet is positioned to face toward a bow of said vessel such that a pressure differential is generated whereby said blower generates an amount of forward thrust when air is sucked into said air inlet and expelled from an air outlet.

9. The vessel of claim 1 further comprising outriggers for stabilizing the vessel.

10. A multi-hulled vessel wherein said vessel includes at least two hulls such that an air tunnel is formed between said at least two hulls, said vessel comprising:
    an air cavity beneath each of said at least two hulls wherein said air cavity receives pressurized air from a blower and wherein said blower is positioned to utilize a ram air effect;
    a surface drive prop for propelling said vessel; and
    internal air lubricators comprising slotted grooves for transferring a portion of said pressurized air from said air cavities to portions of said hulls in contact with water.

11. A boat having at least to two hull sections connected by a inner deck structure such that said inner deck structure is supported above a water surface to form an air tunnel between said two hull sections, said boat comprising:
    a blower for providing pressurized air underneath said two hull sections such that a portion of said two hull sections is substantially prevented from coming into contact with said water surface wherein said blower has an inlet that is positioned such that air is forced into said inlet when said boat is moving in a forward direction;
    a surface drive prop for providing thrust to propel said boat hull across said water surface;
    an engine for powering said blower and said surface drive prop; and
    air lubricators for providing a lubricating air flow along portions of said two hull sections wherein said hulls are configured to utilize a venturi effect to suck air underneath said hulls.

12. The boat of claim 11 further comprising at least one boost port for providing a sealing air flow that impedes at least a portion of said pressurized air underneath said hull sections from escaping.

13. The boat of claim 11 wherein said surface drive prop has blades having a pitch that is controllably adjustable.

14. The boat of claim 11 further comprising coupling means for coupling said prop and said blower to said engine wherein said coupling means allow said prop to operate at speed that is substantially independent of a speed of said engine.

15. The boat of claim 11 further comprising water redirecting projections adapted to direct a flow of water toward a blow through area such that a portion of said pressurized gas is prevented from venting from underneath said hulls through said blow through area.

16. The boat of claim 11 further comprising air tunnel restricting means wherein said air tunnel restricting means adjustably restrict the amount of air that can flow through said air tunnel thereby by inducing a tunnel compression effect.

17. The boat of claim 11 further comprising a non-trip side projection positioned on an exterior of each of said hull portions such that said non-trip side projection exerts an upward force upon said associated hull portion when said boat tips toward said non-trip side projection.

18. The boat of claim 11 further comprising an air inlet damper for restricting the amount of air entering said blower.

19. The boat of claim 11 further comprising an air outlet damper for restricting the amount of air exiting said blower.

20. The boat of claim 11 further comprising flow separators positioned on said hull sections such that said flow separators direct water away from said hull sections.

* * * * *